United States Patent
Wernecke

(10) Patent No.: US 10,338,672 B2
(45) Date of Patent: Jul. 2, 2019

(54) SYSTEM AND METHOD FOR MANIPULATING OBJECTS IN A GRAPHICAL USER INTERFACE

(75) Inventor: Gregg Wernecke, La Crescent, MN (US)

(73) Assignee: Business Objects Software Ltd., Dublin (IE)

( * ) Notice: Subject to any disclaimer, the term of this patent is extended or adjusted under 35 U.S.C. 154(b) by 948 days.

(21) Appl. No.: 13/030,461

(22) Filed: Feb. 18, 2011

(65) Prior Publication Data

US 2012/0216150 A1    Aug. 23, 2012

(51) Int. Cl.
*G06F 3/0486* (2013.01)
*G06F 3/033* (2013.01)
*G06F 3/01* (2006.01)

(52) U.S. Cl.
CPC ............. *G06F 3/01* (2013.01); *G06F 3/017* (2013.01); *G06F 3/033* (2013.01); *G06F 3/0486* (2013.01)

(58) Field of Classification Search
CPC ......... G06F 3/033; G06F 3/0486; G06F 3/017
USPC ................................................. 715/769, 863
See application file for complete search history.

(56) References Cited

U.S. PATENT DOCUMENTS

| | | | |
|---|---|---|---|
| 5,880,743 A * | 3/1999 | Moran et al. | 345/473 |
| 6,263,278 B1 * | 7/2001 | Nikiel | G01C 21/3676 340/995.1 |
| 7,089,896 B2 | 8/2006 | Kushler et al. | |
| 7,382,358 B2 | 6/2008 | Kushler et al. | |
| 7,453,439 B1 | 11/2008 | Kushler et al. | |
| 2002/0015064 A1 * | 2/2002 | Robotham et al. | 345/863 |
| 2002/0109737 A1 * | 8/2002 | Jaeger | 345/863 |
| 2004/0196316 A1 | 10/2004 | Handy et al. | |
| 2005/0198591 A1 * | 9/2005 | Jarrett et al. | 715/863 |
| 2006/0085767 A1 * | 4/2006 | Hinckley et al. | 715/863 |
| 2006/0150104 A1 * | 7/2006 | Lira | 715/733 |
| 2006/0230056 A1 * | 10/2006 | Aaltonen | G06F 17/30265 |
| 2007/0040813 A1 | 2/2007 | Kushler et al. | |
| 2007/0220080 A1 * | 9/2007 | Humphrey | 709/203 |
| 2008/0104526 A1 * | 5/2008 | Jaeger | G06F 3/0481 715/763 |
| 2008/0309644 A1 * | 12/2008 | Arimoto | 345/173 |
| 2009/0143141 A1 * | 6/2009 | Wells et al. | 463/37 |
| 2009/0289900 A1 * | 11/2009 | Lavski et al. | 345/173 |

(Continued)

OTHER PUBLICATIONS

Screenshots of Microsoft Windows (Jul. 22, 2009, pp. 1-9).*

*Primary Examiner* — Doon Y Chow
*Assistant Examiner* — Le V Nguyen
(74) *Attorney, Agent, or Firm* — Schwegman Lundberg & Woessner, P.A.

(57) ABSTRACT

A system, computer-readable storage medium including instructions, and a computer-implemented method for manipulating one or more objects in a graphical user interface for a display device is presented. A start of a path selection mode is detected. A first path traversed by a cursor in the graphical user interface is detected, with the first path intersecting one or more objects in a plurality of objects displayed in the graphical user interface of the display device. A curve corresponding to the first path is displayed in the graphical user interface. An end of the path selection mode is detected. A selection state of the one or more objects is updated based on the curve, the selection state including a selected state and a deselected state.

23 Claims, 26 Drawing Sheets

(56) References Cited

U.S. PATENT DOCUMENTS

| | | | |
|---|---|---|---|
| 2010/0114471 A1* | 5/2010 | Sugiyama | G01C 21/3664 701/532 |
| 2010/0235786 A1* | 9/2010 | Maizels | G06F 3/011 715/810 |
| 2010/0295793 A1* | 11/2010 | Srinivasan et al. | 345/173 |
| 2011/0035705 A1* | 2/2011 | Faenger | G06F 17/30053 715/811 |
| 2011/0093778 A1* | 4/2011 | Kim et al. | 715/702 |
| 2011/0164055 A1* | 7/2011 | McCullough | G06F 3/04845 345/642 |
| 2011/0310026 A1* | 12/2011 | Davis et al. | 345/173 |
| 2012/0026100 A1* | 2/2012 | Migos et al. | 345/173 |
| 2012/0030566 A1* | 2/2012 | Victor | 715/702 |

* cited by examiner

SYSTEM AND METHOD FOR MANIPULATING OBJECTS IN A GRAPHICAL USER INTERFACE

TECHNICAL FIELD

The disclosed embodiments relate generally to a system and method for manipulating objects in a graphical user interface.

BACKGROUND

Objects displayed in a graphical user interface of a computer system may be manipulated in a number of ways. For example, to select objects, a user of the computer system may use a pointing device to draw a rectangular box around the objects to be selected. Similarly, the user may use the pointing device to select an object. Furthermore, the user may use a combination of the pointing device and a key of a keyboard (e.g., a "shift" key, a "Ctrl" key, etc.) to select or deselect multiple objects. Once the objects are selected, various operations may be performed on the objects. For example, the objects may be moved or resized.

BRIEF DESCRIPTION OF THE DRAWINGS

Like reference numerals refer to corresponding parts throughout the drawings.

DESCRIPTION OF EMBODIMENTS

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for manipulating objects in a graphical user interface of a display device for a computer system. An exemplary computer system 1700 is illustrated in FIG. 17. The computer system 1700 includes a user interface module 1702 configured to receive commands from a user via an input device (e.g., a mouse, a keyboard, a touch-sensitive display, etc.) of the computer system 1700 and to display and/or manipulate user interface objects in a display device of the computer system 1700. The user interface module 1702 is described in more detail with respect to FIGS. 1-16 and 18-29 below.

Path Selection Mode

As discussed above, objects in a graphical user interface may be selected using a number of techniques. For example, a selection rectangle may be used to select objects that intersect the selection rectangle. Alternatively, a pointing device may be used to select objects (e.g., by hovering over the object and clicking on a mouse button, etc.). However, when a user desires to select a subset of objects that are closely packed together, a selection rectangle may inadvertently select unwanted objects. Similarly, using a pointing device to individually select each object may be tedious.

Thus, some embodiments provide a path selection mode in which objects intersecting a path traced by a cursor are selected and/or deselected. The path selection mode is described in detail with respect to FIGS. 1A and 2-9 and FIGS. 18-19.

FIGS. 1A and 2-9 are block diagrams illustrating paths that are used to select and/or deselect objects in a path selection mode of the graphical user interface 100, according to some embodiments.

Figure 1A:
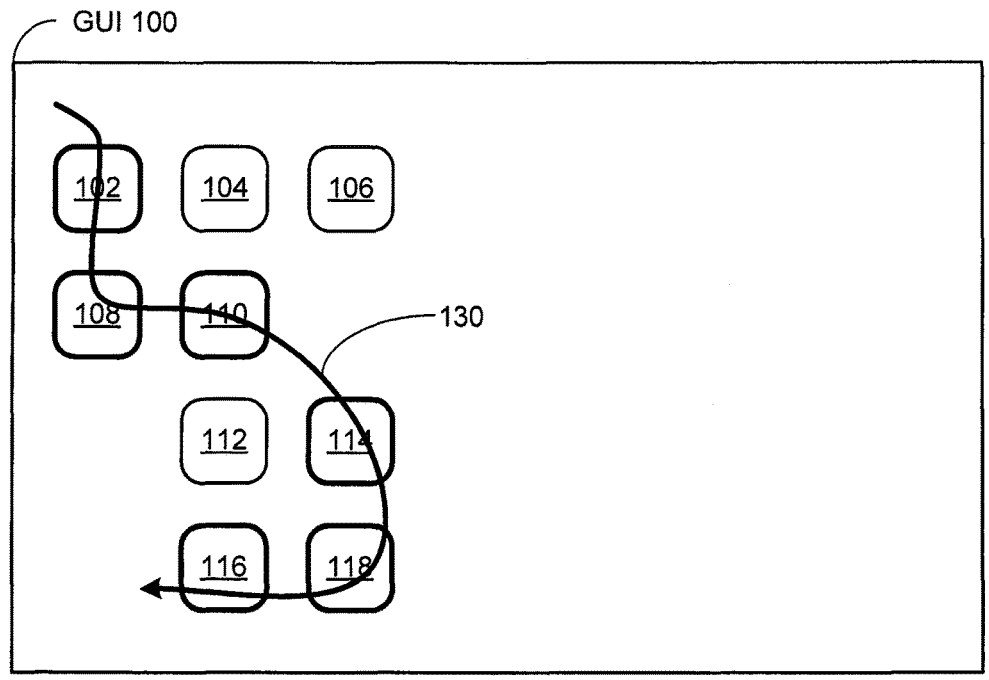
FIG. 1A is a block diagram illustrating a path that is used to select multiple objects in a path selection mode of a graphical user interface, according to some embodiments.

In FIG. 1A, the graphical user interface 100 includes objects 102-118 and a path 130. Note that the arrow head on the path 130 is used to indicate the direction in which the path was drawn. In practice, the arrow head may or may not be displayed depending on the application. In some embodiments, a curve corresponding to the path 130 is displayed in the graphical user interface 100. Note that the term "path" is used to refer to a sequence of points traversed by a cursor in the graphical user interface whereas the term "curve" is used to refer to a visual element corresponding to the path or a function of one or more paths (e.g., addition of paths, subtraction of paths, etc.) that is displayed in the graphical user interface. When a curve intersects an object, the selection state of the object is toggled. For example, in FIG. 1A, the curve corresponding to the path 130 intersects the objects 102, 108, 110, 114, 116, and 118. Accordingly, the selection state of these objects is toggled between a "selected" state and a "deselected" state based on a previous selection state of these objects. Assuming that the previous selection state of these objects was the "deselected" state, the selection state for these objects is toggled to the "selected" state. After toggling the selection state of these objects, the user interface module 1702 may modify the visual appearance of these objects to indicate the selection state of the objects. For example, the user interface module 1702 may highlight the objects, create an outline around the objects, create a shadow under the object, and the like.

Note that a rectangular selection box may be used to select these objects if multiple selection boxes are drawn while depressing an appropriate key (e.g., the "Ctrl" key). Similarly, each object may be selected individually while depressing an appropriate key (e.g., the "Ctrl" key). However, the path selection mode provides an intuitive and simple technique for selecting and/or deselecting multiple objects.

Figure 2:
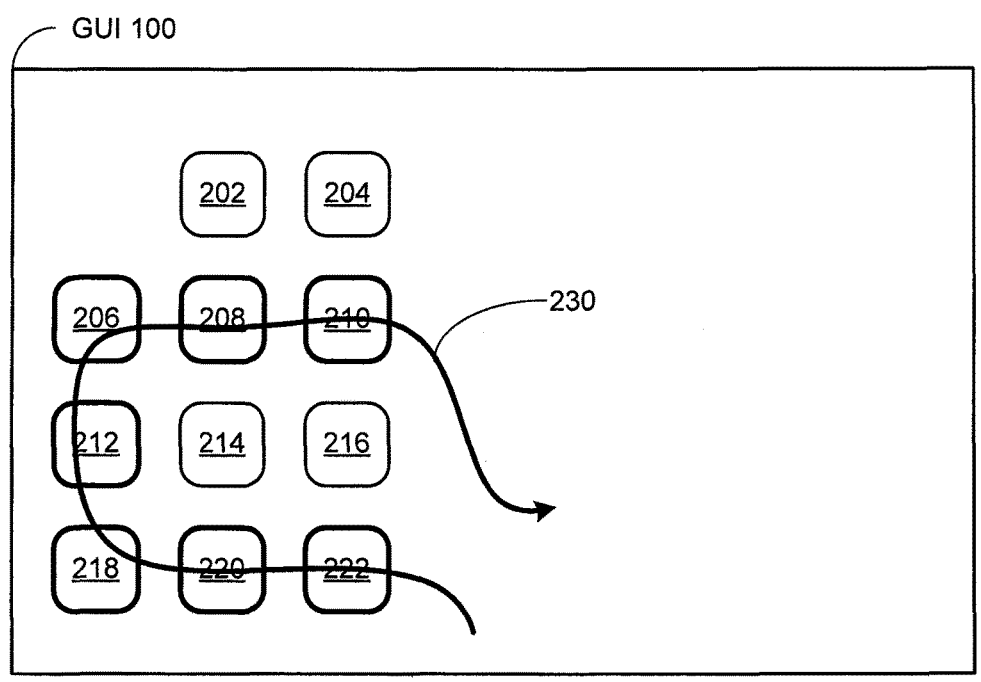
FIG. 2 is a block diagram illustrating another path that is used to select multiple objects in the path selection mode of the graphical user interface, according to some embodiments.

In FIG. 2, the graphical user interface 100 includes objects 202-222 and a path 230. A curve corresponding to the path 230 intersects the objects 206, 208, 210, 212, 218, 220, and 222. Assuming that a previous selection state of these objects was the "deselected" state, the selection state for these objects is toggled to the "selected" state.

Figure 3:
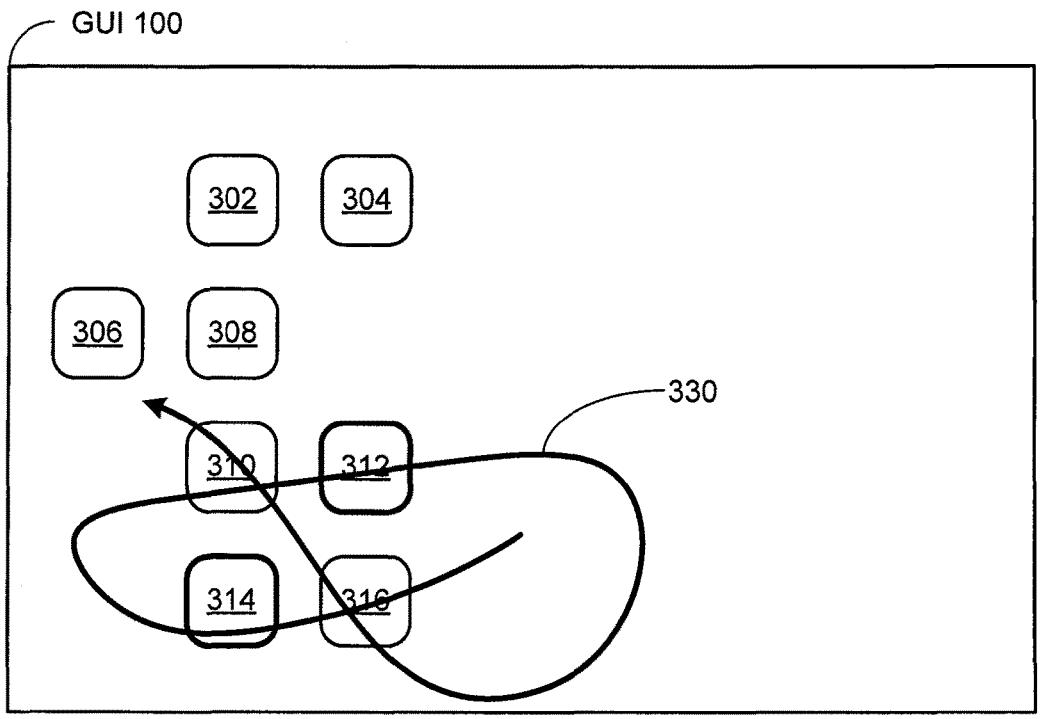
FIG. 3 is a block diagram illustrating a path that is used to select and deselect multiple objects in the path selection mode of the graphical user interface, according to some embodiments.

In FIG. 3, the graphical user interface 100 includes objects 302-316 and a path 330. A curve corresponding to the path 330 intersects the objects 310 and 316 twice and intersects the objects 312 and 314 once. Each time a path intersects an object, the selection state of the object is effectively toggled. The selection state of the object may be toggled each time the path intersects the object as the path is being drawn. Alternatively, the selection state of the object may be toggled, if at all, at the end of the path selection mode. For example, if the path intersects the object an even number of times, the selection state of the object is not toggled. In contrast, if the path intersects the object an odd number of times, the selection state of the object is toggled. Assuming that a previous selection state of these objects was the "deselected" state, the selection state for the objects 312 and 314 is toggled to the "selected" state because the curve corresponding to the path 330 intersects the objects 312 and 314 an odd number of times. The selection state of the objects 310 and 316 remains in the "deselected" state because the curve corresponding to the path 330 intersects the objects 310 and 316 an even number of times.

Figure 4:
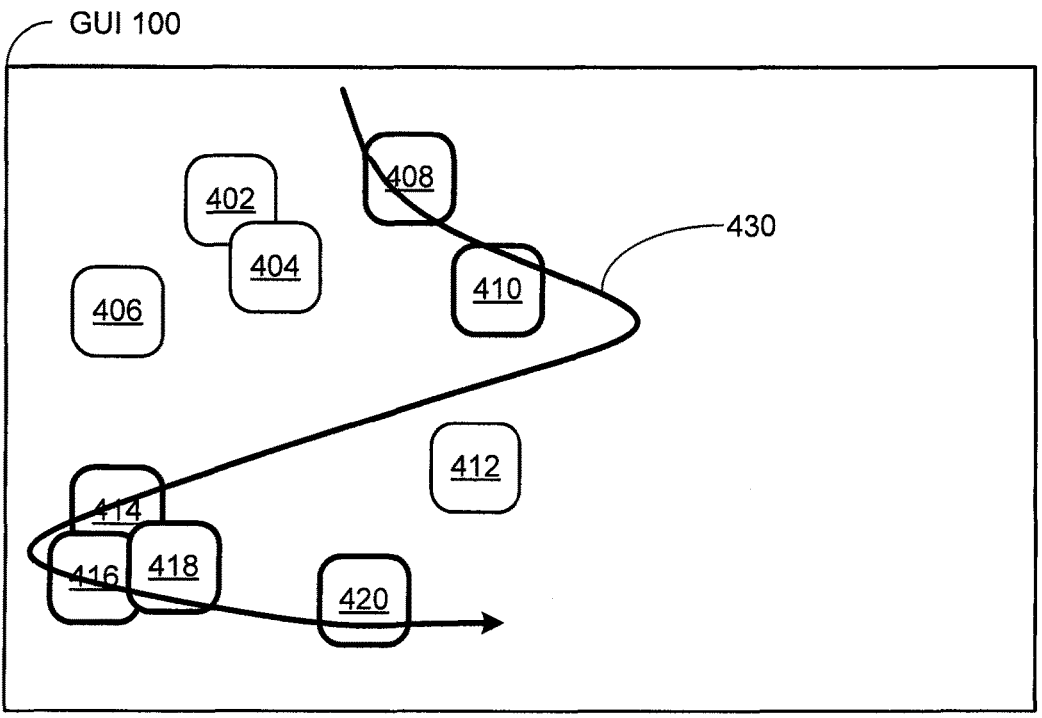
FIG. 4 is a block diagram illustrating another path that is used to select multiple objects in the path selection mode of the graphical user interface, according to some embodiments.

In FIG. 4, the graphical user interface 100 includes objects 402-420 that are off-grid and a path 430. A curve corresponding to the path 430 intersects the objects 408, 410, 414, 416, 418, and 420. Assuming that a previous selection state of these objects was the "deselected" state, the selection state for these objects is toggled to the "selected" state.

Figure 5:
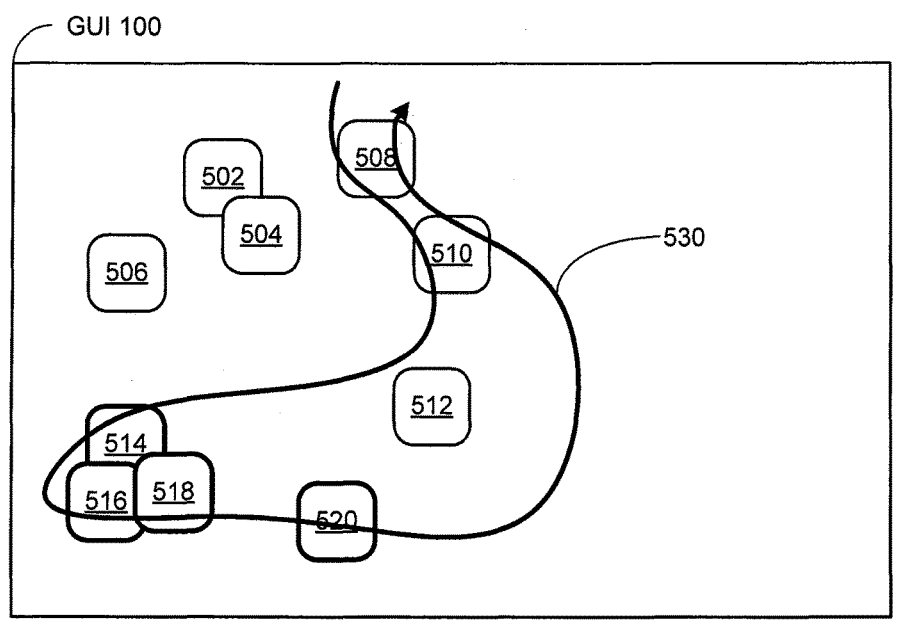
FIG. 5 is a block diagram illustrating another path that is used to select and deselect multiple objects in the path selection mode of the graphical user interface, according to some embodiments.

In FIG. 5, the graphical user interface 100 includes objects 502-520 that are off-grid and a path 530. A curve corresponding to the path 530 intersects the objects 508 and 510 twice and intersects the objects 514, 516, 518, and 520 once. Assuming that a previous selection state of these objects was the "deselected" state, the selection state for the objects 514, 516, 518, 520 is toggled to the "selected" state because the curve corresponding to the path 530 intersects the objects 514, 516, 518, and 520 an odd number of times. The selection state of the objects 508 and 510 remains in the "deselected" state because the curve corresponding to the path 550 intersects the objects 508 and 510 an even number of times.

Figure 6:
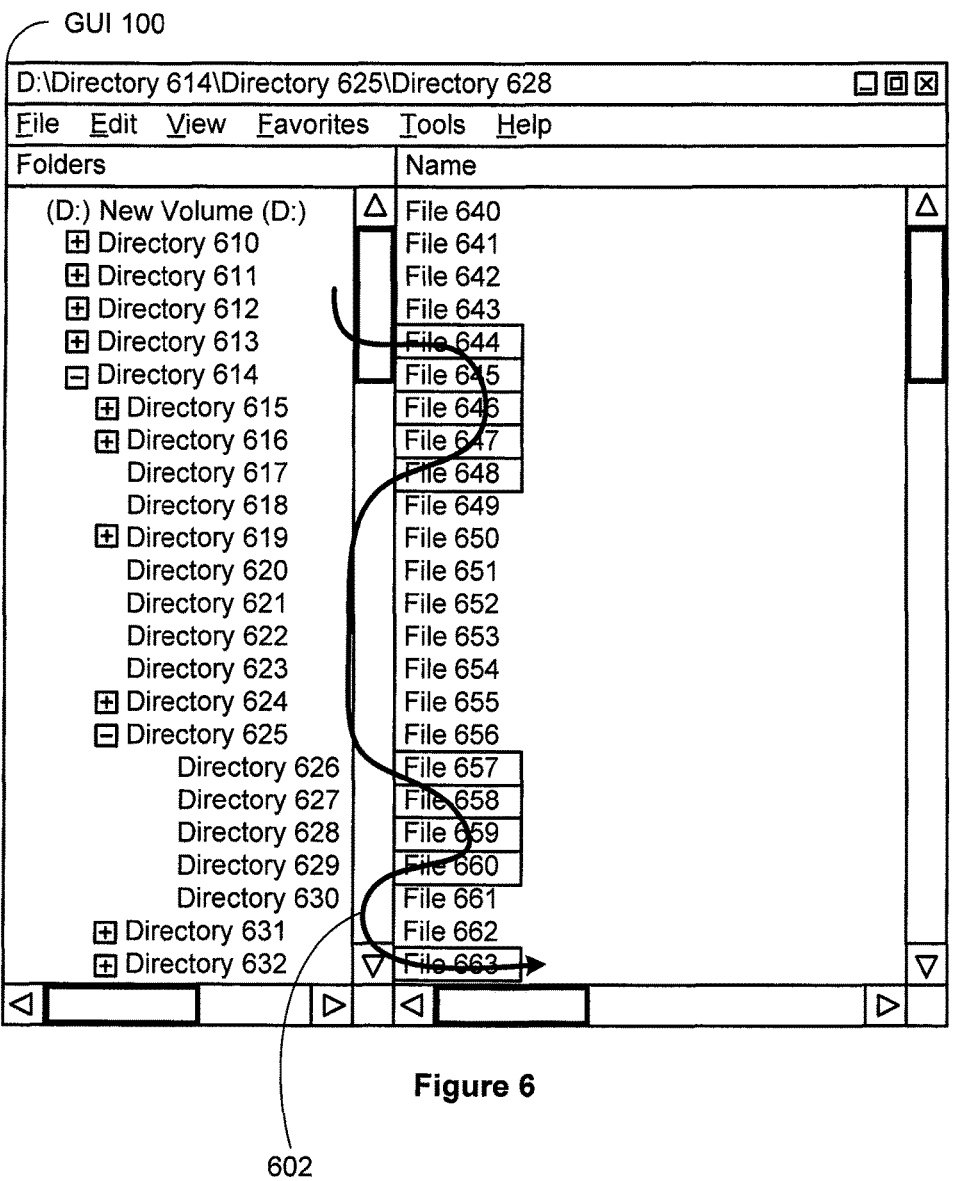
FIG. 6 is a block diagram illustrating another path that is used to select multiple objects in the path selection mode of the graphical user interface, according to some embodiments.

In FIG. 6, the graphical user interface 100 includes a hierarchical listing of directories 610-632, a listing of files 640-663, and a path 602. A curve corresponding to the path 602 intersects the files 644-648, 657-660, and 663. Assuming that a previous selection state of these files was the "deselected" state, the selection state for these files is toggled to the "selected" state.

Figure 7:
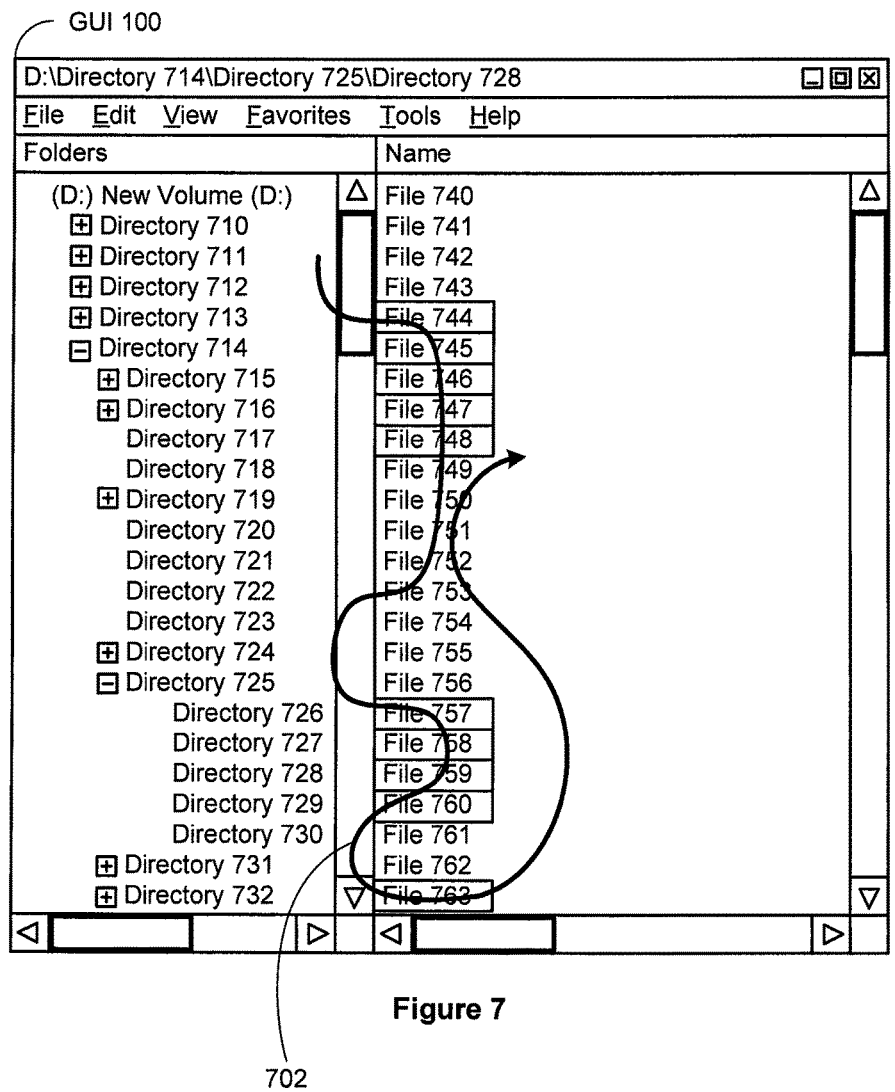
FIG. 7 is a block diagram illustrating another path that is used to select and deselect multiple objects in the path selection mode of the graphical user interface, according to some embodiments.

In FIG. 7, the graphical user interface 100 includes a hierarchical listing of directories 710-732, a listing of files 740-763, and a path 702. A curve corresponding to the path 702 intersects the files 744-748, 757-760, and 763 once and intersects the files 749-753 twice. Assuming that a previous selection state of these files was the "deselected" state, the selection state for the files 744-748, 757-760, and 763 is toggled to the "selected" state because the curve corresponding to the path 702 intersects the files 744-748, 757-760, and 763 an odd number of times. The selection state for the files 749-753 remains in the "deselected" state because the curve corresponding to the path 702 intersects the files 749-753 an even number of times.

Figure 8:
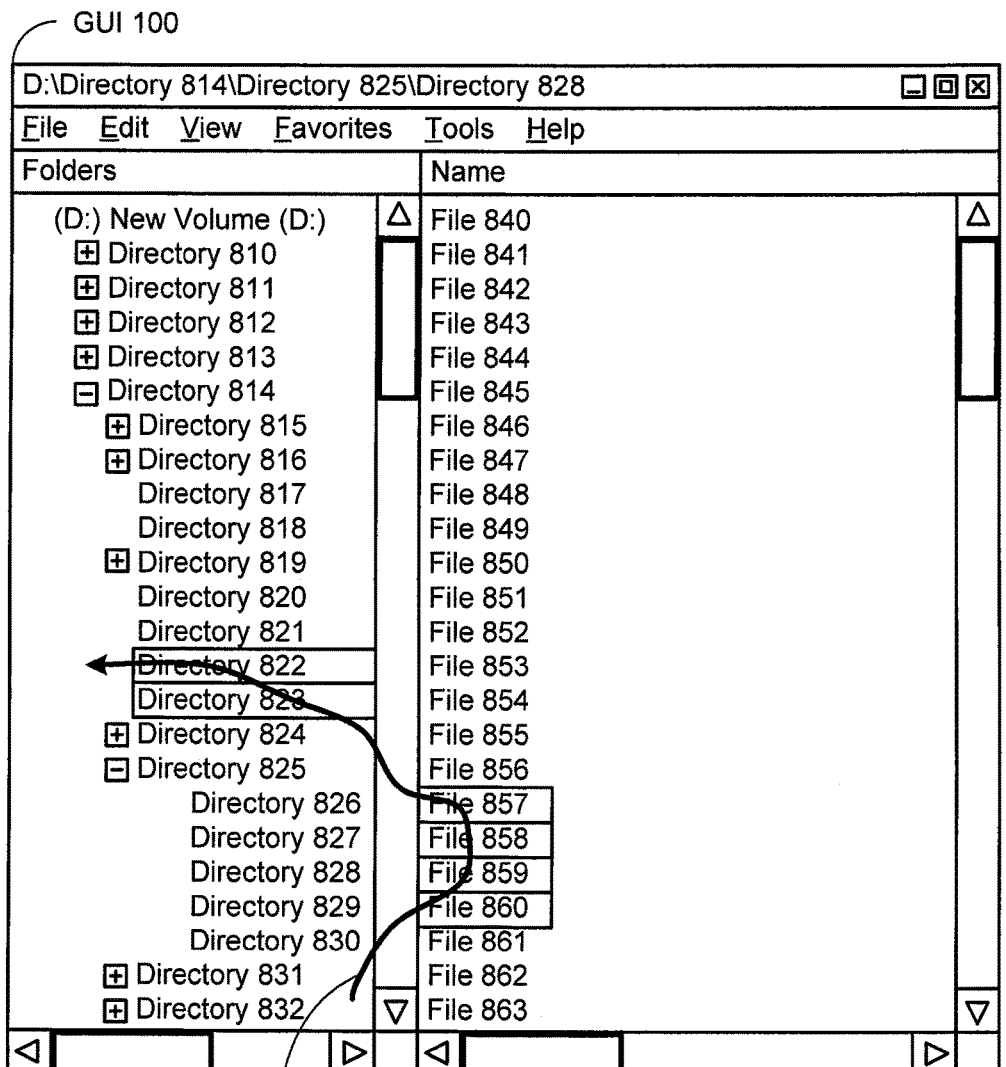
FIG. 8 is a block diagram illustrating another path that is used to select multiple objects in the path selection mode of the graphical user interface, according to some embodiments.

In FIG. 8, the graphical user interface 100 includes a hierarchical listing of directories 810-832, a listing of files 840-863, and a path 802. A curve corresponding to the path 802 intersects the files 857-860 and directories 822-823. Assuming that a previous selection state of these files and directories was the "deselected" state, the selection state for these files and directories is toggled to the "selected" state.

Figure 9:
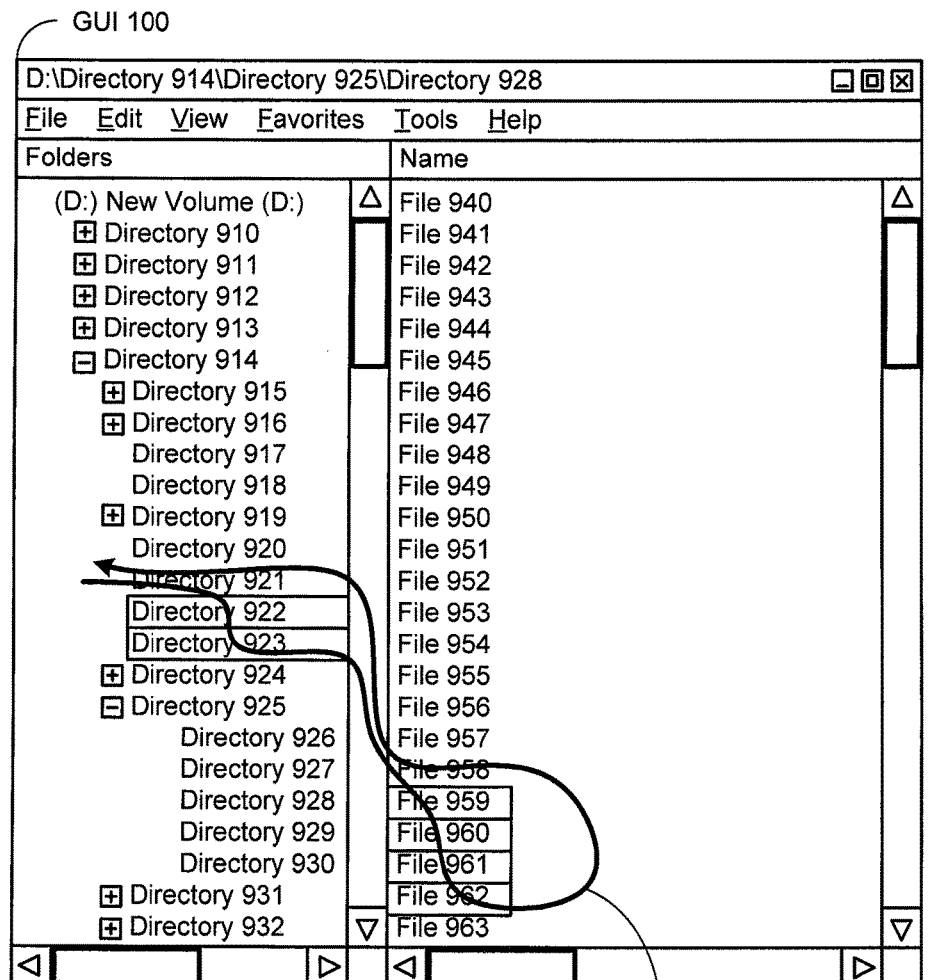
FIG. 9 is a block diagram illustrating another path that is used to select and deselect multiple objects in the path selection mode of the graphical user interface, according to some embodiments.

In FIG. 9, the graphical user interface 100 includes a hierarchical listing of directories 910-932, a listing of files 940-963, and a path 902. A curve corresponding to the path 902 intersects the files 959-962 and the directories 922-923 once and intersects the file 958 and the directory 921 twice. Assuming that a previous selection state of these files was the "deselected" state, the selection state for the files 959-962 and the directories 922-923 is toggled to the "selected" state because the curve corresponding to the path 902 intersects the files 959-962 and the directories 922-923 an odd number of times. The selection state for the file 958 and the directory 921 remains in the "deselected" state because the curve corresponding to the path 902 intersects the file 958 and the directory 921 an even number of times.

Figure 18:
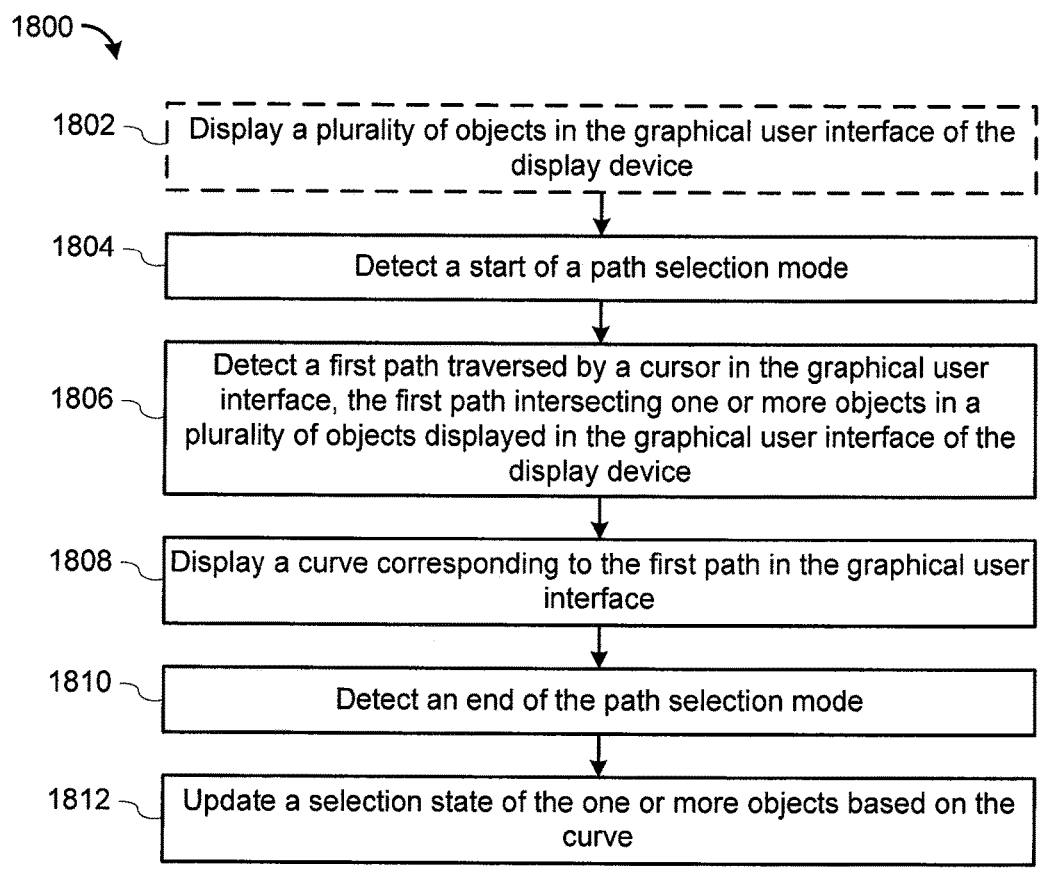
FIG. 18 is a flowchart of a method for manipulating objects in a graphical user interface for a display device, according to some embodiments.

The operations performed by the user interface module 1702 to enable the path selection mode discussed above are described in more detail with respect to FIG. 18, which is a flowchart of a method 1800 for manipulating objects in a graphical user interface for a display device, according to some embodiments.

In some embodiments, the user interface module 1702 displays (1802) a plurality of objects in the graphical user interface of the display device for the computer system 1700.

The user interface module 1702 detects (1804) a start of a path selection mode. The path selection mode of the graphical user interface may be initiated using various techniques. For example, the path selection mode of the graphical user interface may be initiated using a predetermined key sequence, a pointing device button (e.g., a left mouse button press and hold), a gesture performed by a pointing device, a gesture performed by a finger on a touch-sensitive display device, a gesture performed in free space using a free space pointer (e.g., a three-dimensional mouse, etc.), a gesture performed in free space using body parts (e.g., a hand, a finger, etc.) and a visual motion recognition system, and/or a voice command. Alternatively, the path selection mode of the graphical user interface may be enabled by default.

The user interface module 1702 detects (1806) a first path traversed by a cursor in the graphical user interface, with the first path intersecting one or more objects in the plurality of objects displayed in the graphical user interface 100 of the display device. For example, in FIG. 1A, a path 130 intersects the objects 102, 108, 110, 112, 114, 116, and 118.

The user interface module 1702 displays (1808) a curve corresponding to the first path in the graphical user interface. For example, in FIG. 1A, the user interface module 1702 displays a curve corresponding to the path 130. In some embodiments, the curve is displayed as the path is drawn. In some embodiments, the curve is displayed after the end of the path selection mode.

In some embodiments, the path is drawn in two-dimensional space. In these embodiments, the corresponding curve is a curve in two-dimensional space.

In some embodiments, the path is drawn in three-dimensional space. In these embodiments, the corresponding curve is a curve in three-dimensional space.

The user interface module 1702 detects (1810) an end of the path selection mode. The path selection mode of the graphical user interface may be ended using various techniques. For example, the path selection mode of the graphical user interface may be ended using a predetermined key sequence, a pointing device button (e.g., a left mouse button press and hold), a gesture performed by a pointing device, a gesture performed by a finger on a touch-sensitive display device, a gesture performed in free space using a free space pointer (e.g., a three-dimensional mouse, etc.), a gesture performed in free space using body parts (e.g., a hand, a finger, etc.) and a visual motion recognition system, and/or a voice command.

Figure 19:
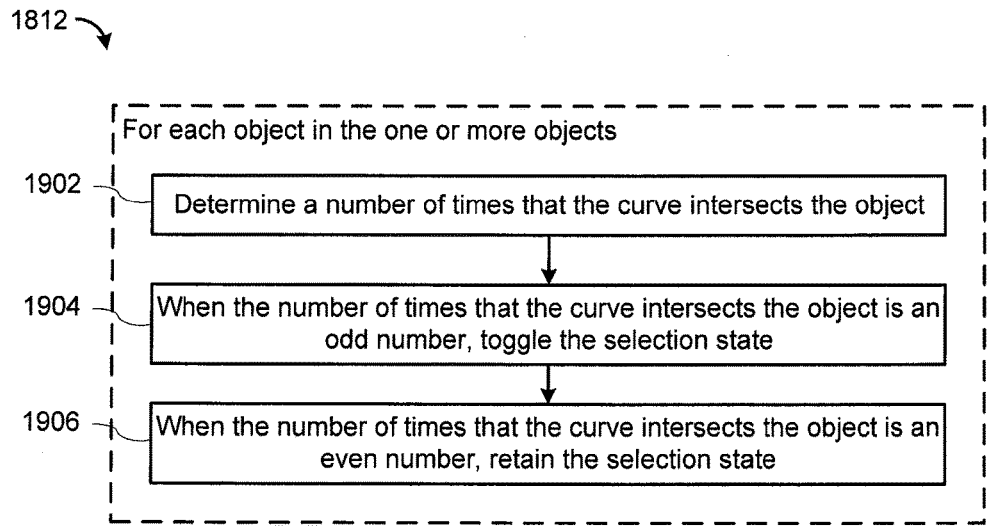
FIG. 19 is a flowchart of a method for updating a selection state of one or more objects based on a curve, according to some embodiments.

The user interface module 1702 updates (1812) a selection state of the one or more objects based on the curve, the selection state including a selected state and a deselected state. Attention is now directed to FIG. 19, which is a flowchart of a method for updating (1812) the selection state of the one or more objects based on the curve, according to some embodiments. For each object in the one or more objects, the user interface module 1702 determines (1902) a number of times that the curve intersects the object. When the number of times that the curve intersects the object is an odd number, the user interface module 1702 toggles (1904) the selection state of the object. When the number of times that the curve intersects the object is an even number, the user interface module 1702 retains (1906) the selection state of the object.

Note that some operations illustrated in FIG. 18 may be performed in a different order. For example, operation 1808 may be performed after operation 1810. Furthermore, operation 1812 may be performed before operation 1810.

In some embodiments, the selection state of the one or more objects is updated as the path is being drawn. In some embodiments, the selection state of the one or more objects is updated after the end of the path selection mode.

After ending the path selection mode, a user may desire to modify the path used to select objects. FIGS. 1B-1D and 27-29 illustrate techniques for modifying a path.

Figure 1B:
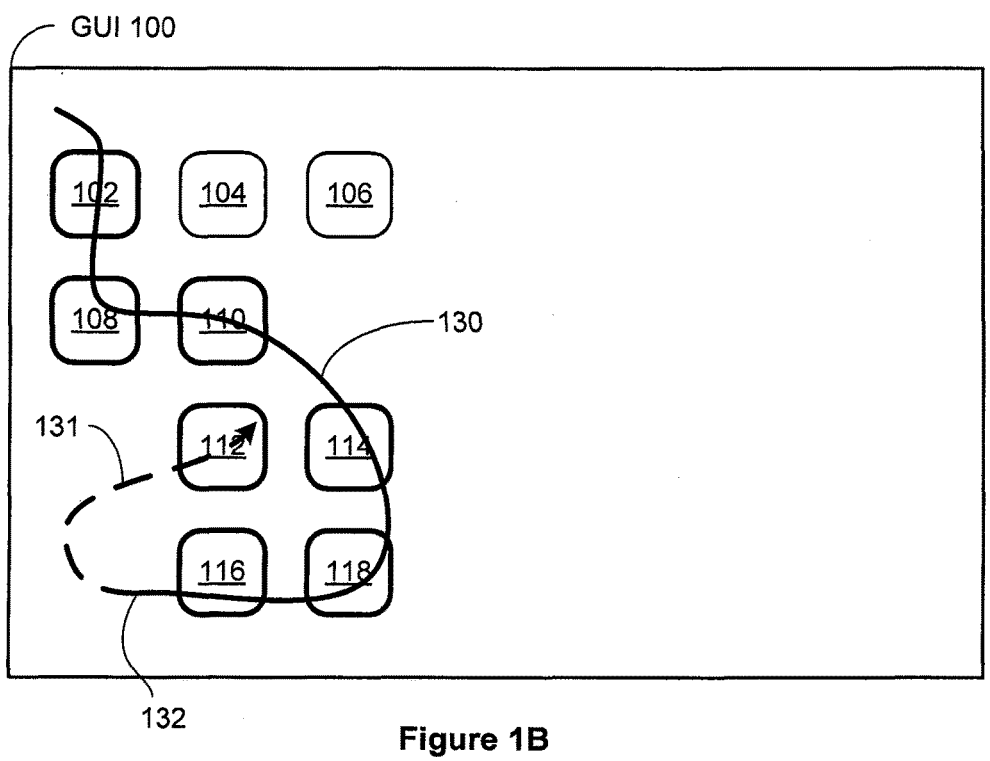
FIG. 1B is a block diagram illustrating a path addition operation performed on the path illustrated in FIG. 1A and the resulting objects that are selected, according to some embodiments.
Figure 27:
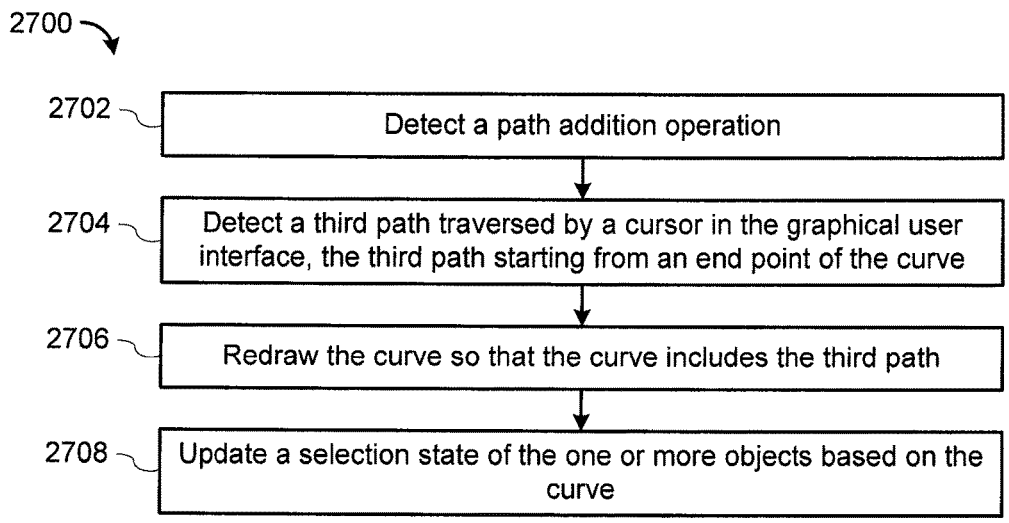
FIG. 27 is a flowchart of a method for increasing a length of a path, according to some embodiments.

Some embodiments provide a path addition operation for increasing a length of a path. The path addition operation is described in more detail with respect to FIGS. 1B and 27. FIG. 1B is a block diagram illustrating a path addition operation performed on the path illustrated in FIG. 1A and the resulting objects that are selected, according to some embodiments. FIG. 27 is a flowchart of a method 2700 for increasing a length of a path, according to some embodiments.

The user interface module 1702 detects (2702) a path addition operation. The path addition operation may be initiated using any of the techniques discussed above with respect to starting and/or ending the path selection mode.

The user interface module 1702 detects (2704) a third path traversed by a cursor in the graphical user interface, the third path starting from an end point of the curve. For example, in FIG. 1B, the third path may be a path 131 that starts at an end point 132 of the path 130 (or the displayed curve corresponding to the path 130).

The user interface module 1702 redraws (2706) the curve so that the curve includes the third path. For example, in FIG. 1B, the curve includes the path 130 and the path 131.

The user interface module 1702 updates (2708) a selection state of the one or more objects based on the curve (e.g., as described above with respect to FIG. 19). For example, in FIG. 1B, a curve corresponding to the combination of the path 130 and 131 additionally intersects the object 112. Accordingly, assuming that a previous selection state of the object 112 was the "deselected" state, the selection state of the object 112 is toggled to the "selected" state.

Figure 1C:
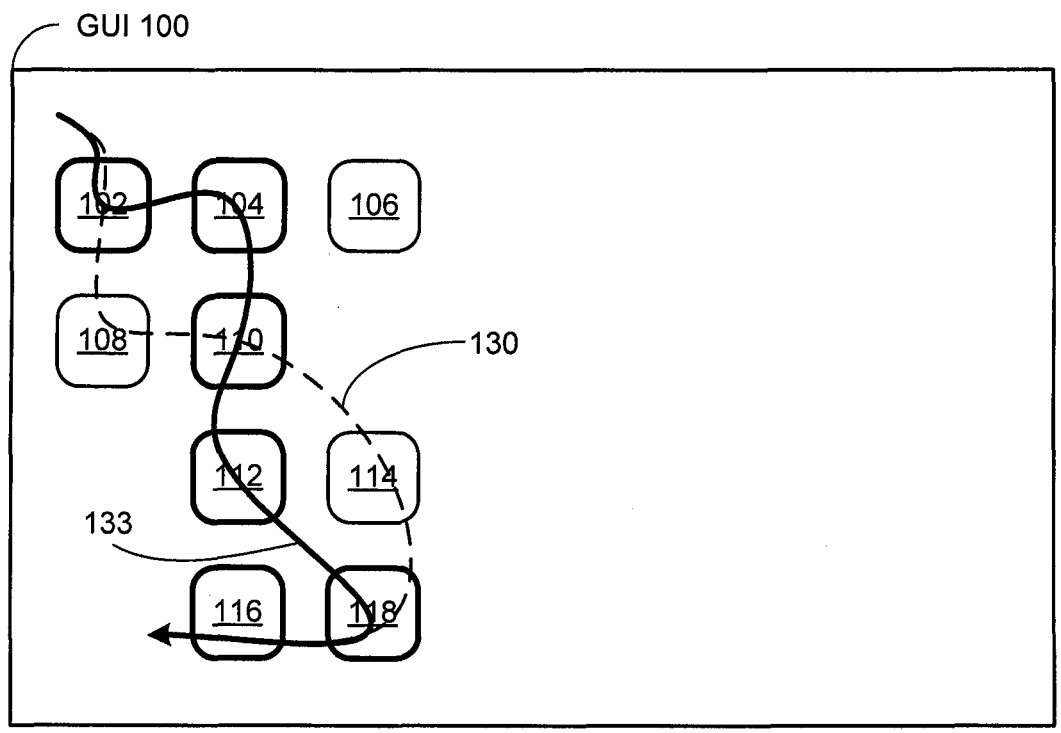
FIG. 1C is a block diagram illustrating a modification of the path illustrated in FIG. 1A and the resulting objects that are selected, according to some embodiments.
Figure 28:
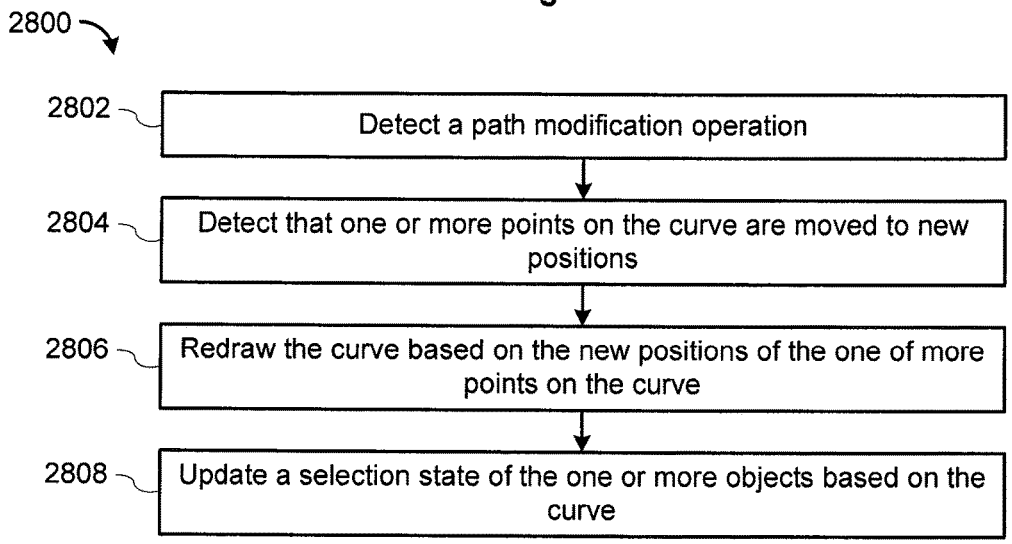
FIG. 28 is a flowchart of a method for modifying a path, according to some embodiments.

Some embodiments provide a path modification operation for modifying a shape of a path. The path modification operation is described in more detail with respect to FIGS. 1C and 28. FIG. 1C is a block diagram illustrating a modification of the path illustrated in FIG. 1A and the resulting objects that are selected, according to some embodiments. FIG. 28 is a flowchart of a method 2800 for modifying a path, according to some embodiments.

The user interface module 1702 detects (2802) a path modification operation. The path modification operation may be initiated using any of the techniques discussed above with respect to starting and/or ending the path selection mode.

The user interface module 1702 detects (2804) that one or more points on the curve are moved to new positions. In some embodiments, the user interface module 1702 modifies the path based on the new positions of the one or more points. For example, in FIG. 1C, several points of the path 130 are moved to new positions and the user interface module 1702 generates a path 133 based on the new positions of the points.

The user interface module 1702 redraws (2806) the curve based on the new positions of the one of more points on the curve. For example, in FIG. 1C, the curve corresponds to the path 133. Note that the length of the curve may increase or decrease to conform to the new positions of the points.

The user interface module 1702 updates (2808) a selection state of the one or more objects based on the curve (e.g., as described above with respect to FIG. 19). For example, in FIG. 1C, a curve corresponding to the path 133 no longer intersects the objects 108 and 114. Thus, the selection state of the objects 108 and 114 are toggled to the "deselected" state. Furthermore, in FIG. 1C, the curve corresponding to the path 133 now intersects the objects 104 and 112. Thus, assuming that a previous selection state of the objects 104 and 112 was the "deselected" state, the selection state of the object 104 and 112 is toggled to the "selected" state.

Figure 1D:
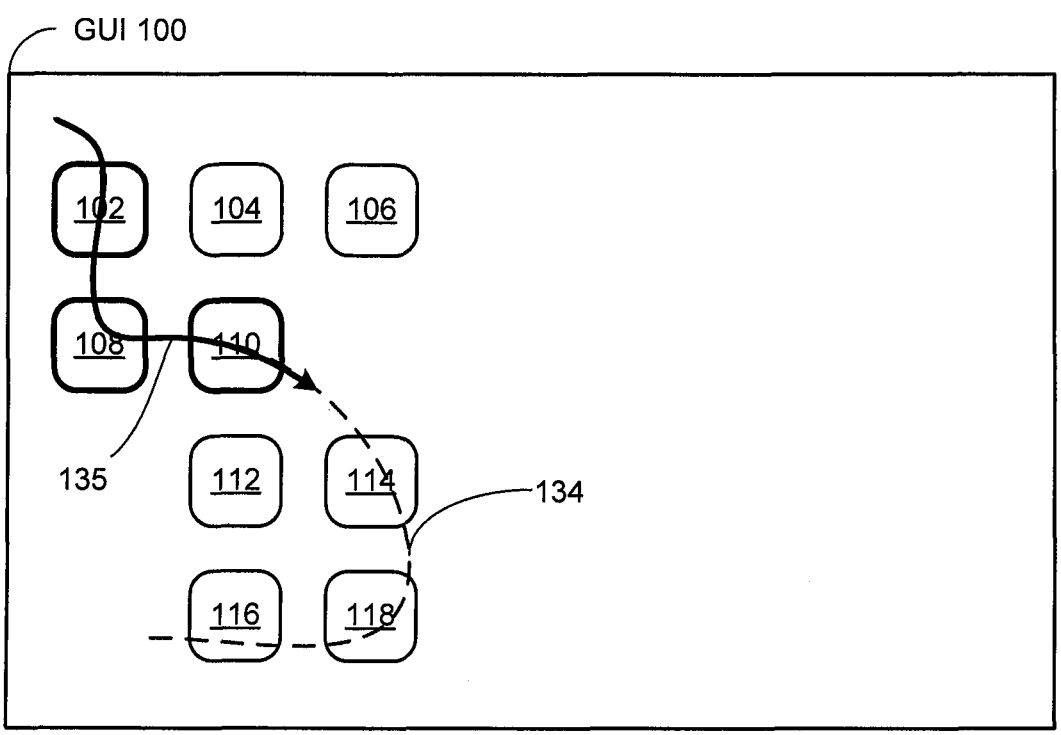
FIG. 1D is a block diagram illustrating a subtraction of the path illustrated in FIG. 1A and the resulting objects that are selected, according to some embodiments.
Figure 29:
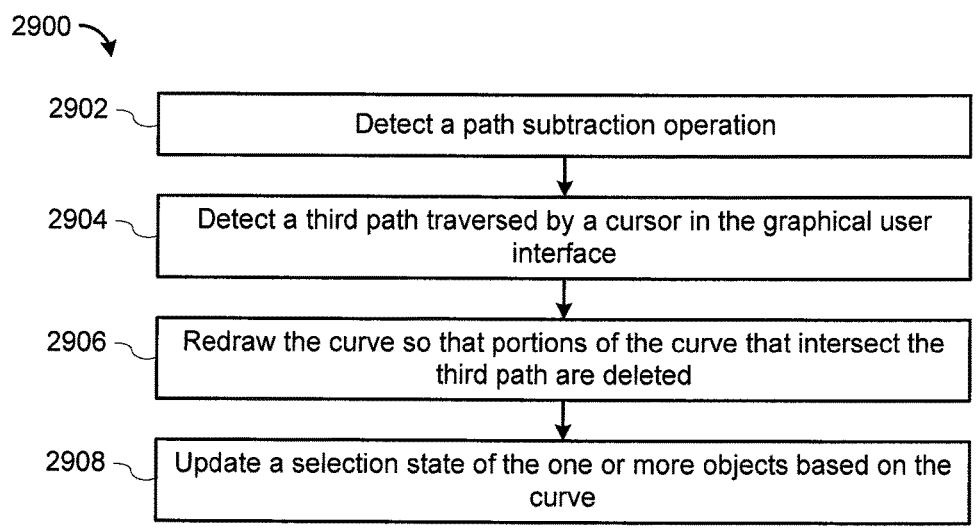
FIG. 29 is a flowchart of a method for decreasing a length of a path, according to some embodiments.

Some embodiments provide a path subtraction operation for shortening a length of a path. The path subtraction operation is described in more detail with respect to FIGS. 1D and 29. FIG. 1D is a block diagram illustrating a subtraction of the path illustrated in FIG. 1A and the resulting objects that are selected, according to some embodiments. FIG. 29 is a flowchart of a method 2900 for shortening a length of a path, according to some embodiments.

The user interface module 1702 detects (2902) a path subtraction operation. The path subtraction operation may be initiated using any of the techniques discussed above with respect to starting and/or ending the path selection mode.

The user interface module 1702 detects (2904) a third path traversed by a cursor in the graphical user interface. For example, in FIG. 1D, the third path may be a path 134 (the dashed line).

The user interface module 1702 redraws (2906) the curve so that portions of the curve that intersect the third path are deleted. For example, in FIG. 1D, the curve is based on a path 135, which is a result of subtracting the path 134 from the path 130.

The user interface module 1702 updates (2908) a selection state of the one or more objects based on the curve (e.g., as described above with respect to FIG. 19). For example, in FIG. 1D, a curve corresponding to the path 135 no longer intersects the objects 114, 116, and 118. Thus, the selection state of the objects 114, 116, and 118 is toggled to the "deselected" state.

Note that the path addition, the path subtraction and the path modification operations may modify the length of the curve.

In some embodiments, the path selection mode described above may be used in conjunction with existing selection techniques. For example, a selection state of an object may be set using existing selection techniques (e.g., using a selection rectangle, using a Ctrl-click operation, using a Shift-click operation, etc.) before and/or after using the path selection mode.

In some embodiments, when using existing selection techniques to set the selection state of an object, an implied path may be inferred. For example, when using a Ctrl-click (or a Shift-click operation) to select and/or deselect objects, the order in which the objects are selected may infer an implied path. The user interface module 1702 may use interpolation between consecutive objects in a sequence of Ctrl-click (or Shift-click operations) to infer an implied path between the consecutive objects. When using a selection rectangle (or other bulk selection techniques), the user interface module 1702 may use a starting corner (or point) and an ending corner (or point) of the selection rectangle to infer an implied path. For example, the selection rectangle may be defined by an upper left corner and a lower right corner (e.g., the user draws the selection rectangle from the upper left corner to the lower right corner). The user interface module 1702 may infer an implied path by determining an implied sequence in which the objects are selected and/or deselected. In this example, the implied sequence may be determined by, for example: (1) starting from the upper left corner of the selection rectangle, objects may be ordered from left to right and then from top to bottom or (2) starting from the upper left corner of the selection rectangle, objects may be ordered from top to bottom and then from left to right. The user interface module may then use interpolation between consecutive objects in the sequence of objects. Instead of determining an implied sequence, the user interface module 1702 may use a curve fitting function to determine an implied path through the objects in the selection rectangle. The implied path may be modified using the techniques described above.

In some embodiments, when using existing selection techniques to set the selection state of an object, a path is not inferred. In these embodiments, although the selection state of objects may be set using the existing techniques, the operations described below are only applied to objects intersecting an explicit path using a path selection mode.

After selecting objects using the path selection mode, various operations may be performed on the selected objects. The following sections describe these operations in more detail.

Pull Operation

In addition to the path addition, path subtraction, and path modification operations discussed above, the curve may be modified using other techniques. Some embodiments provide a pull operation that allows a user to modify a curve. The pull operation is described in detail with respect to FIGS. 10A-10C and 20.

Figure 10A:
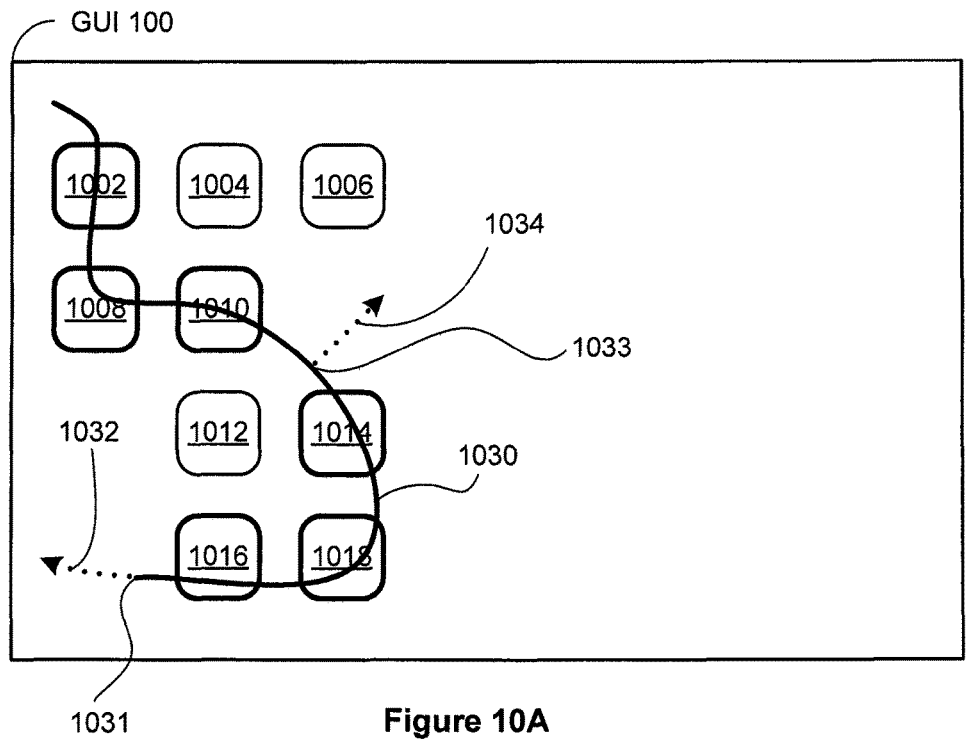
FIG. 10A is a block diagram illustrating a pull operation being performed on a path, according to some embodiments.
Figure 10B:
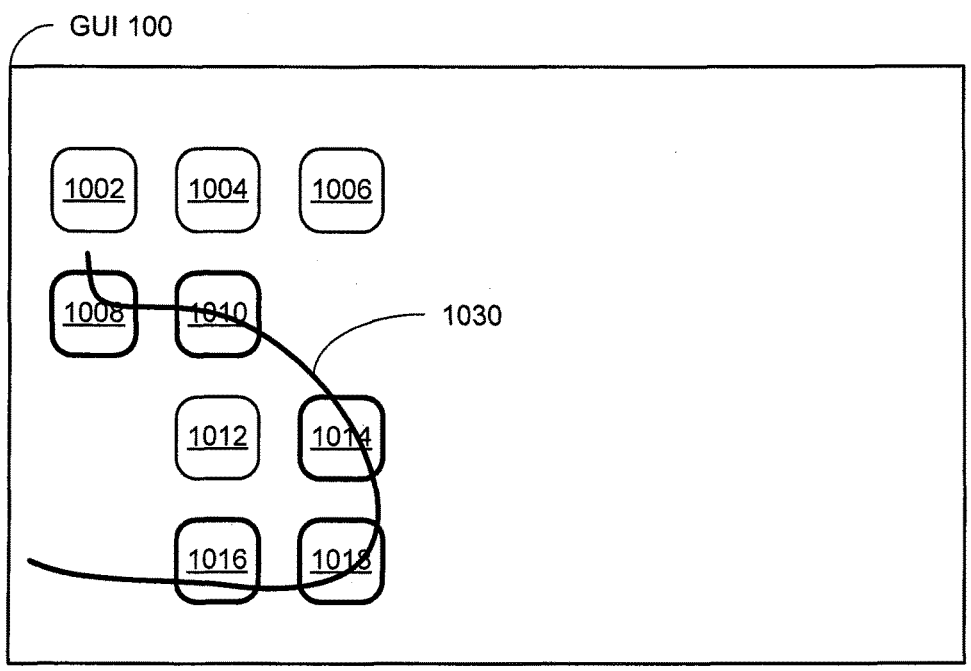
FIG. 10B is a block diagram illustrating the continuation of the pull operation illustrated in FIG. 10A, according to some embodiments.
Figure 10C:
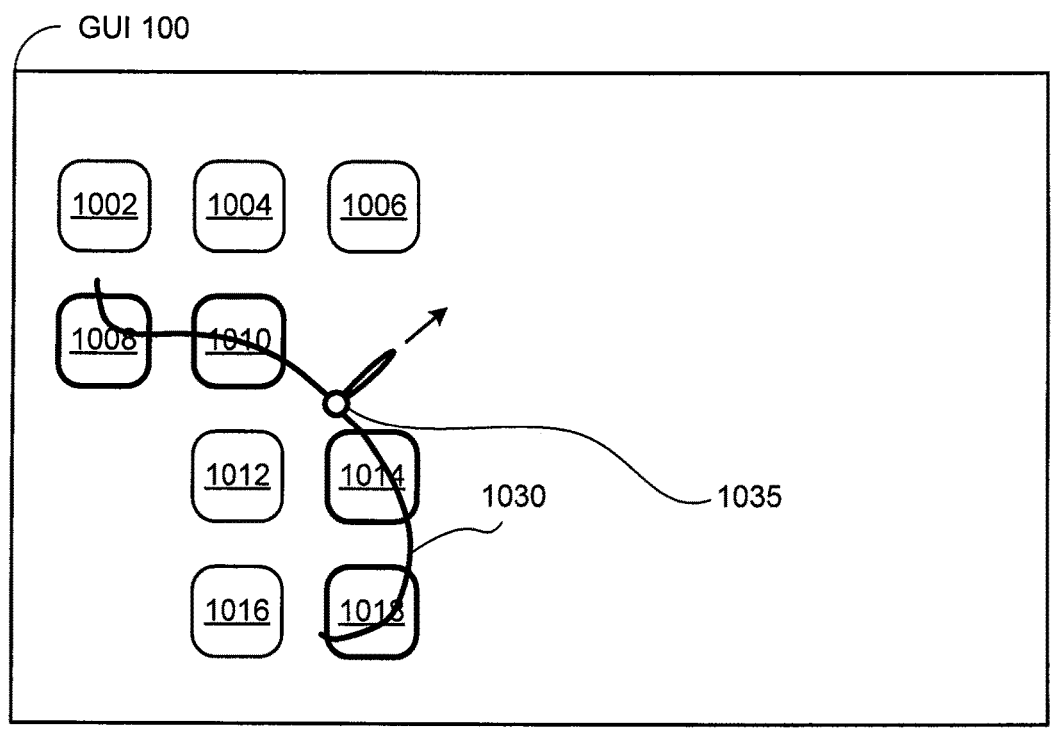
FIG. 10C is a block diagram illustrating another pull operation being performed on the path illustrated in FIG. 10A including a hold area, according to some embodiments.

FIGS. 10A-10C are block diagrams illustrating a pull operation being performed on a path, according to some embodiments. FIGS. 10A-10C include objects 1002-1018 displayed in the graphical user interface 100. As illustrated in FIG. 10A, a curve corresponding to a path 1030 is displayed in the graphical user interface 100. The curve corresponding to the path 1030 may have been generated during a path generation mode or as a result of a path addition operation, a path subtraction operation, and/or a path modification operation performed on an existing curve. As illustrated in FIG. 10A, the curve corresponding to the path 1030 intersects the objects 1002, 1008, 1010, 1014, 1016, and 1018. Once the pull operation has been initiated, the curve may be pulled.

As illustrated in FIGS. 10A and 10B, a user pulls the curve corresponding to the path 1030 from a point 1031 (e.g., an end of the curve) along a path 1032, as indicated by the dashed line in FIG. 10A. As the curve is pulled, the curve may intersect new objects or no longer intersect objects. For example, in FIG. 10B, the curve no longer intersects the object 1002. In some embodiments, portions of the curve that are on the path 1030 are constrained to move along the path 1030. In these embodiments, portions of the curve that are not on the path 1030 are allowed to move freely.

Similarly, as illustrated in FIGS. 10A and 10C, a user pulls the curve corresponding to the path 1030 from a point 1033 along a path 1034, as indicated by the dashed line in FIG. 10A. Again, as the curve is pulled, the curve may intersect new objects or no longer intersect objects. For example, in FIG. 10C, the curve no longer intersects the objects 1002 and 1016. Furthermore, portions of the curve that are on the path 1030 may be constrained to move along the path 1030, as illustrated in FIG. 10C. In some embodiments, a hold area 1035 is used to constrain the curve to move through the hold area. The hold area is discussed in more detail with respect to FIGS. 12A-12B.

Figure 20:
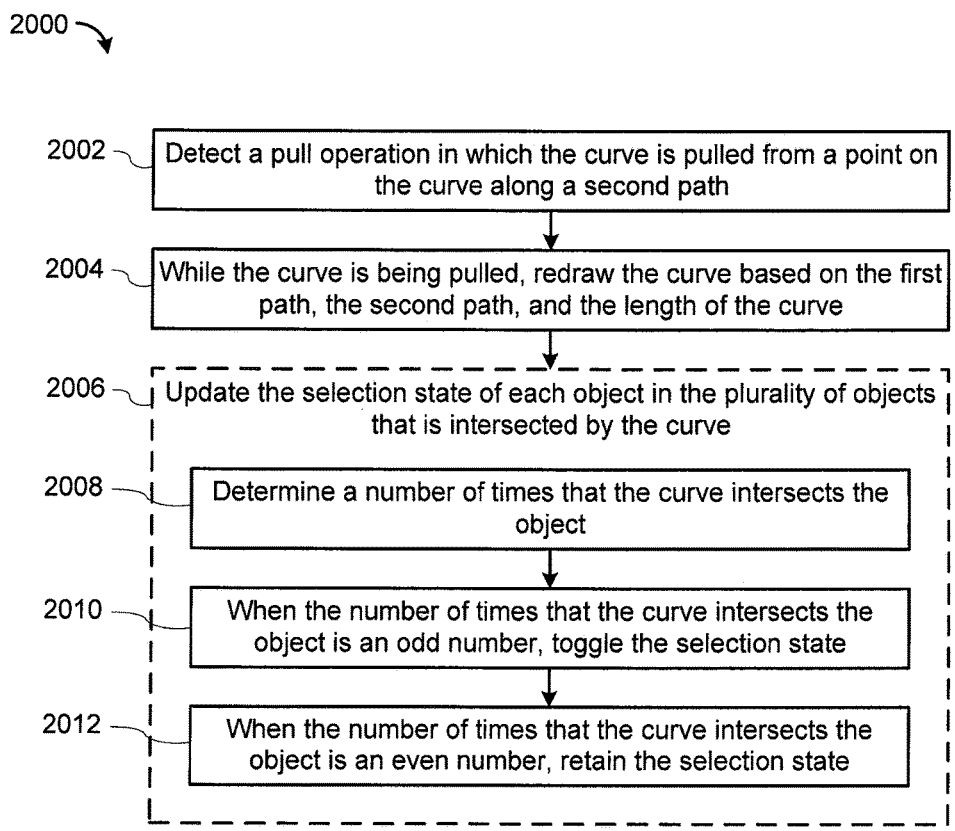
FIG. 20 is a flowchart of a method for updating a selection state of objects in response to a pull operation performed on a path, according to some embodiments.

The operations performed by the user interface module 1702 to enable the pull operation discussed above are described in more detail with respect to FIG. 20, which is a flowchart of a method 2000 for updating a selection state of objects in response to a pull operation performed on a path, according to some embodiments.

The user interface module 1702 detects (2002) a pull operation in which the curve is pulled from a point on the curve (e.g., the point 1031 or the point 1033) along a second path (e.g., the path 1032 or the path 1034). In some embodiments, portions of the curve that are on the first path (e.g., the path 1030) are constrained to move along the first path (e.g., the path 1030). In some embodiments, a pull operation is initiated when a user causes a cursor of the graphical user interface to intersect the curve (e.g., hover over the curve) for a predetermined amount of time. Alternatively, the pull operation may be initiated using any of the techniques discussed above with respect to starting and/or ending the path selection mode.

While the curve is being pulled, the user interface module 1702 redraws (2004) the curve based on the first path (e.g., the path 1030), the second path (e.g., the path 1032 or the path 1034), and a length of the curve.

The user interface module 1702 updates (2006) the selection state of each object in the plurality of objects that is intersected by the curve as follows. The user interface module 1702 determines (2008) a number of times that the curve intersects the object. When the number of times that the curve intersects the object is an odd number, the user interface module 1702 toggles (2010) the selection state. When the number of times that the curve intersects the object is an even number, the user interface module 1702 retains (2012) the selection state.

In some embodiments, the length of the curve remains constant during the pull operation. In some embodiments, the length of the curve decreases during the pull operation. In some embodiments, the length of the curve increases during the pull operation.

Pull Operation and Knot Point

The behavior of the pull operation described above can be modified by using special user interface elements that constrain the movement of the curve. Some embodiments provide one or more knot points that are placed on a curve to constrain the movement of the curve through objects in the graphical user interface.

Figure 11A:
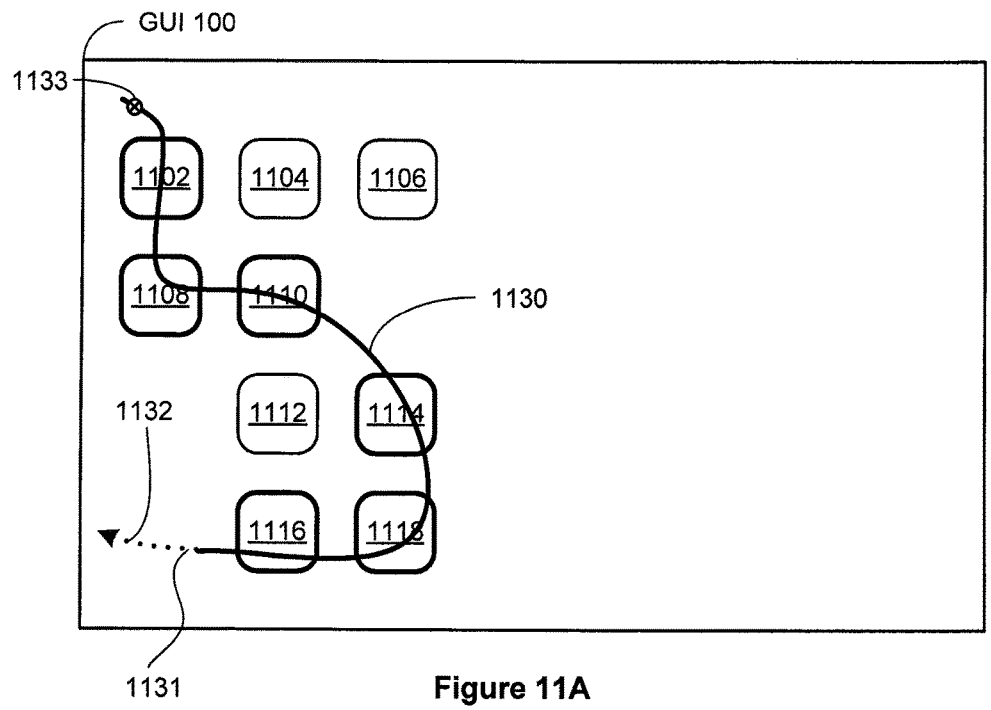
FIG. 11A is a block diagram illustrating a pull operation being performed on a path including a knot point, according to some embodiments.
Figure 11B:
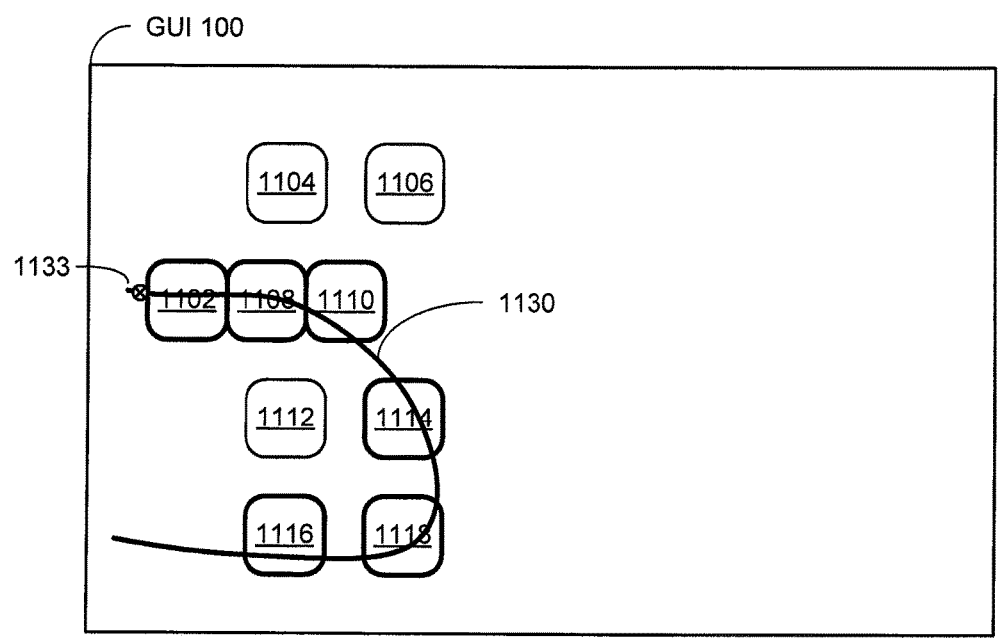
FIG. 11B is a block diagram illustrating the continuation of the pull operation illustrated in FIG. 11A, according to some embodiments.

FIGS. 11A-11B are block diagrams illustrating a pull operation being performed on a path including a knot point, according to some embodiments. FIGS. 11A-11B include objects 1102-1118 displayed in the graphical user interface 100. As illustrated in FIG. 11A, a curve corresponding to a path 1130 is displayed in the graphical user interface 100. The curve corresponding to the path 1130 may have been generated during a path generation mode or as a result of a path addition operation, a path subtraction operation, and/or a path modification operation performed on an existing curve. As illustrated in FIG. 11A, the curve corresponding to the path 1130 intersects the objects 1102, 1108, 1110, 1114, 1116, and 1118. The curve also includes a knot point 1133 that constrains the movement of the curve through objects in the graphical user interface. Once the pull operation has been initiated, the curve may be pulled.

As illustrated in FIGS. 11A and 11B, a user pulls the curve corresponding to the path 1130 from a point 1131 (e.g., an end of the curve) along a path 1132, as indicated by the dashed line in FIG. 11A. The knot point 1133 prevents the curve from being pulled through objects. For example, as illustrated in FIG. 11B, when the knot point 1133 contacts the object 1102, the object 1102 and all subsequent objects that come into contact with the object 1102 are pulled along the path 1130. In some embodiments, objects that contact each other are not allowed to overlap. In other words, the boundary of an object cannot cross the boundary of another object. In some embodiments, objects that contact each other are allowed to overlap at least a portion of each other. As with the standard pull operation, when the curve is pulled, the curve may intersect new objects or no longer intersect objects.

Figure 21:
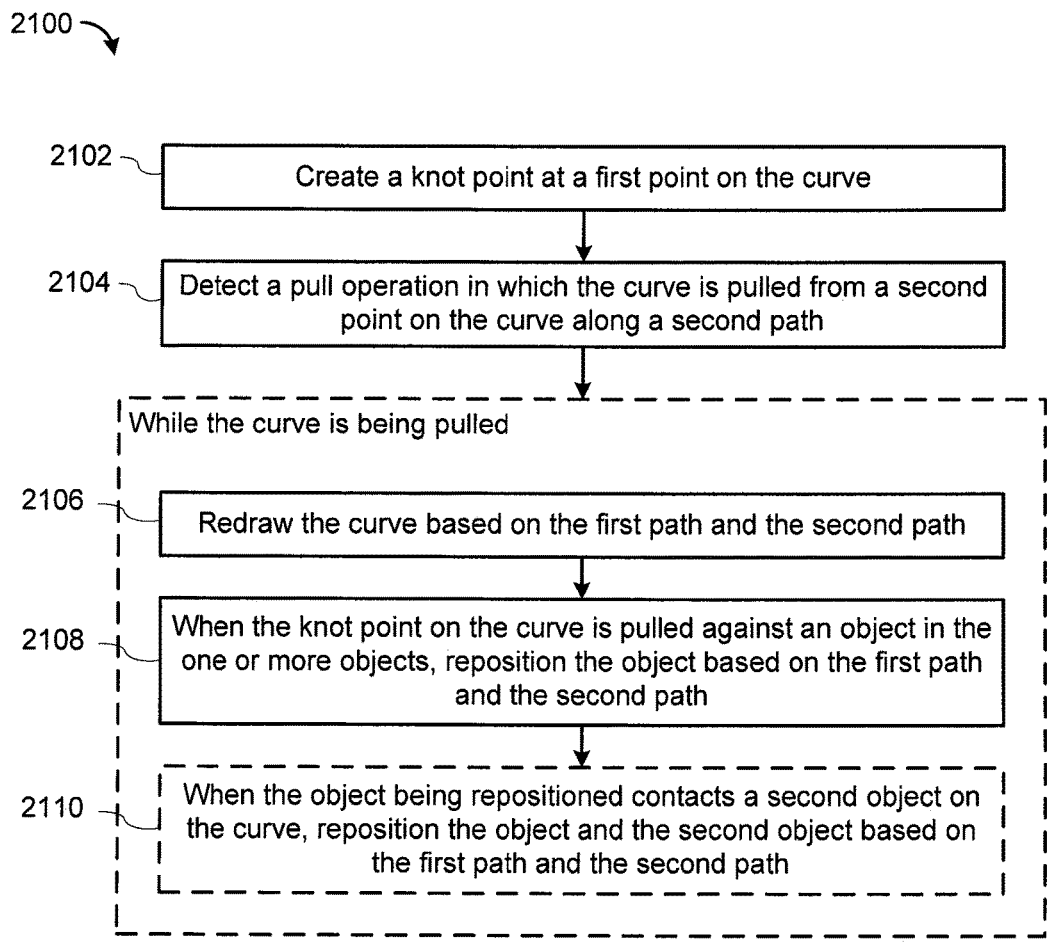
FIG. 21 is a flowchart of a method for updating a selection state of objects in response to a pull operation performed on a path including a knot point, according to some embodiments.

The operations performed by the user interface module 1702 to enable the pull operation being performed on a path including a knot point discussed above are described in more detail with respect to FIG. 21, which is a flowchart of a method 2100 for updating a selection state of objects in response to a pull operation performed on a path including a knot point, according to some embodiments.

The user interface module 1702 creates (2102) a knot point (e.g., the knot point 1133) at a first point on the curve, wherein the knot point prevents the curve from being pulled through objects. Note that the user interface module 1702 may create the knot point in response to a user action (e.g., a sequence of keystrokes, a mouse click, a gesture, etc.) in the graphical user interface. The knot operation may be created after a curve corresponding to a path is displayed in the graphical user interface by accessing a contextual menu (e.g., by right-clicking on the curve, by hovering the cursor over the curve, etc.), a sequence of keystrokes, a gesture, and the like.

The user interface module 1702 detects (2104) a pull operation in which the curve is pulled from a second point (e.g., the point 1131) on the curve along a second path (e.g., the path 1132). In some embodiments, the points of the curve that are on the first path (e.g., the path 1130) are constrained to move along the first path (e.g., the path 1130). As discussed above, the pull operation may be initiated when a user causes a cursor of the graphical user interface to intersect (e.g., hover over) the curve for a predetermined amount of time. Alternatively, the pull operation may be initiated using any of the techniques discussed above with respect to starting and/or ending the path selection mode.

While the curve is being pulled, the following operations are performed. The user interface module 1702 redraws (2106) the curve based on the first path (e.g., the path 1130) and the second path (e.g., the path 1132). When the knot point (e.g., the knot point 1133) on the curve is pulled against an object in the one or more objects (e.g., the object 1102), the user interface module 1702 repositions (2108) the object based on the first path (e.g., the path 1130) and the second path (e.g., the path 1132). When the object being repositioned contacts a second object on the curve (e.g., the object 1108), the user interface module 1702 repositions (2110) the object (e.g., the object 1102) and the second object (e.g., the object 1108) based on the first path (e.g., the path 1130) and the second path (e.g., the path 1132). As discussed above, other objects that come in contact with the object being repositioned and/or the second object are pulled along with these objects.

Some embodiments provide an unknot operation to remove a knot point from a curve.

Pull Operation and Hold Area

Some embodiments provide for one or more hold areas that are placed on a curve to constrain the movement of the curve through the one or more hold areas.

Figure 12A:
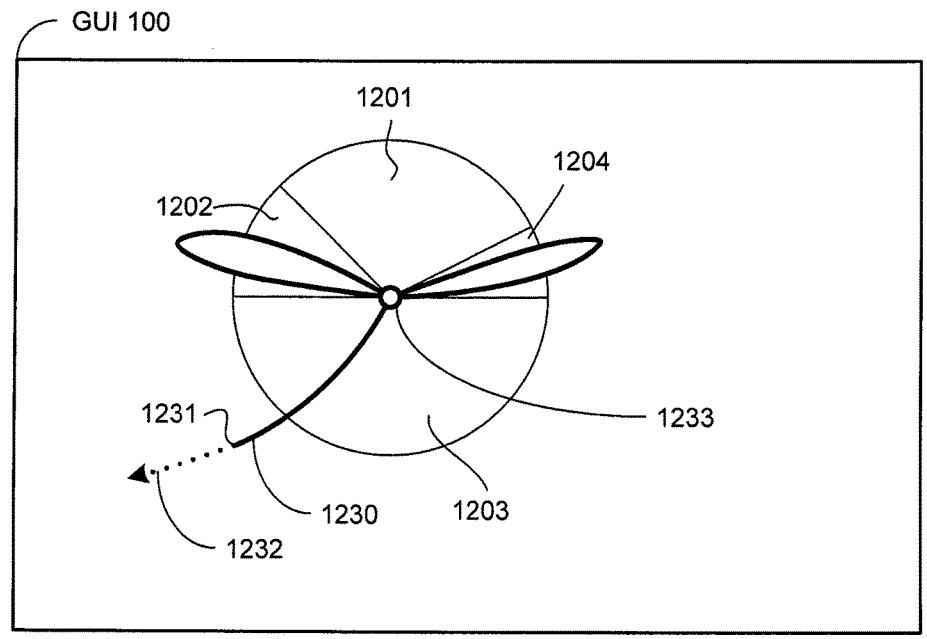
FIG. 12A is a block diagram illustrating a pull operation being performed on a path including a hold area, according to some embodiments.
Figure 12B:
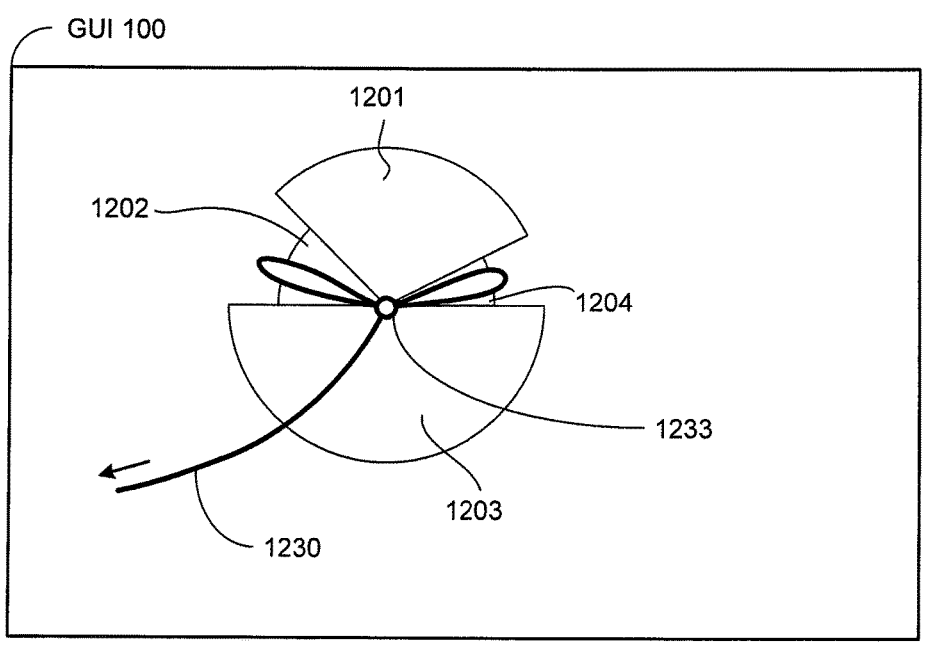
FIG. 12B is a block diagram illustrating the continuation of the pull operation illustrated in FIG. 12A, according to some embodiments.

FIGS. 12A-12B are block diagrams illustrating a pull operation being performed on a path including a hold area, according to some embodiments, FIGS. 12A-12B include objects 1201-1204 displayed in the graphical user interface 100. As illustrated in FIG. 12A, a curve corresponding to a path 1230 is displayed in the graphical user interface 100. The curve corresponding to the path 1230 may have been generated during a path generation mode or as a result of a path addition operation, a path subtraction operation, and/or a path modification operation performed on an existing curve. As illustrated in FIG. 12A, the curve corresponding to the path 1230 intersects the objects 1202, 1203, and 1204. The curve also includes a hold area 1233 that constrains the movement of the curve through the hold area. Once the pull operation has been initiated, the curve may be pulled.

As illustrated in FIGS. 12A and 12B, a user pulls the curve corresponding to the path 1230 from a point 1231 (e.g., an end of the curve) along a path 1232, as indicated by the dashed line in FIG. 12A. The hold area 1233 constrains the movement of the curve through the hold area 1233. For example, as illustrated in FIG. 12B, as the curve is pulled, the portions of the curve within the hold area 1233 are constrained to move along the portions of the path 1230 in the hold area 1233. Portions of the curve that are outside of the hold area 1233 are allowed to move freely and to change shape, as illustrated in FIG. 12B. In some embodiments, as the shape of the curve changes, objects are modified to conform to the shape of the curve. For example, in FIG. 12B, as the portions of the curve that intersect the objects 1202 and 1204 are resized as the shape of the curve is modified.

Figure 22:
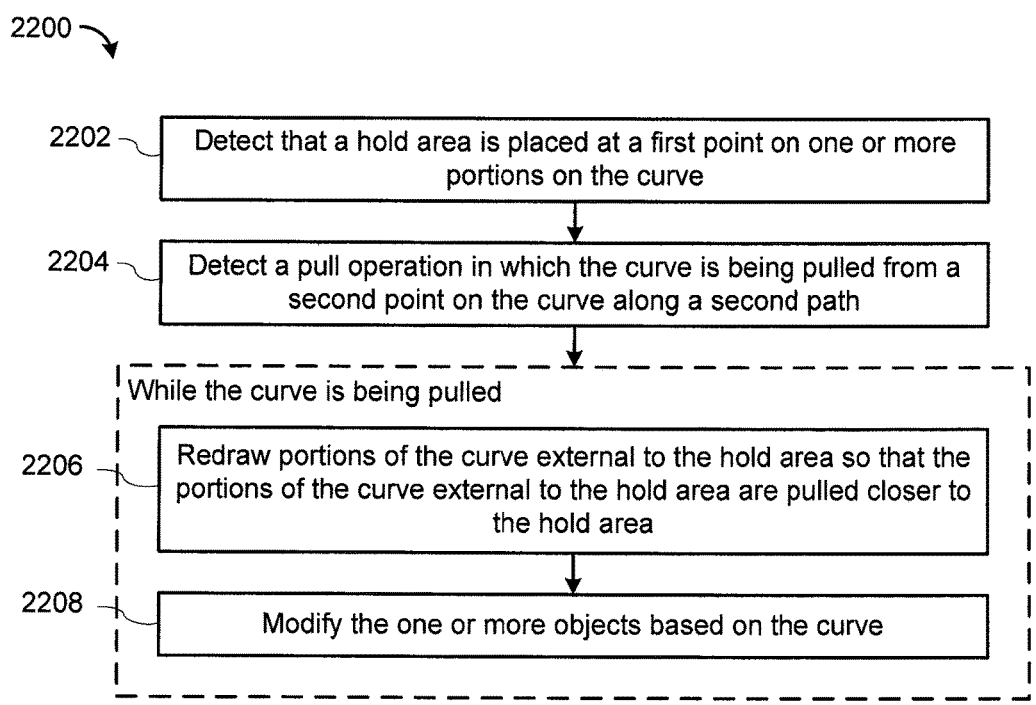
FIG. 22 is a flowchart of a method for modifying objects in response to a pull operation performed on a path including a hold area, according to some embodiments.

The operations performed by the user interface module 1702 to enable the pull operation being performed on a path including a hold area discussed above are described in more detail with respect to FIG. 22, which is a flowchart of a method 2200 for modifying objects in response to a pull operation performed on a path including a hold area, according to some embodiments.

The user interface module 1702 detects (2202) that a hold area (e.g., the hold area 1233) is placed over one or more portions on the curve, wherein the hold area is a fixed area that maintains the shape of the curve that is in the hold area. Note that the hold area may be placed in response to a user action (e.g., a sequence of keystrokes, a mouse click, a gesture, etc.) in the graphical user interface. The hold area may be placed after a curve corresponding to a path is displayed in the graphical user interface by accessing a contextual menu (e.g., by right-clicking on the curve, by hovering the cursor over the curve, etc.), a sequence of keystrokes, a gesture, and the like.

The user interface module 1702 detects (2204) a pull operation in which the curve is being pulled from a second point on the curve (e.g., the point 1231) along a second path (e.g., the path 1232), wherein portions of the curve in the hold area are constrained to move through the hold area in accordance with the shape of the curve (or the path 1230) in the hold area. As discussed above, the pull operation may be initiated when a user causes a cursor of the graphical user interface to intersect (e.g., hover) the curve for a predetermined amount of time. Alternatively, the pull operation may be initiated using any of the techniques discussed above with respect to starting and/or ending the path selection mode.

While the curve is being pulled, following operations are performed. The user interface module 1702 redraws (2206) portions of the curve external to the hold area so that the portions of the curve external to the hold area are pulled closer to the hold area. The user interface module 1702 modifies (2208) the one or more objects based on the curve. In some embodiments, modifying the one or more objects includes one or more of: repositioning the one or more objects, resizing the one or more objects, selecting the one or more objects, and deselecting the one or more objects.

Some embodiments provide an unhold operation to remove a hold area from a curve.

Pluck Operation

A common task performed by users is to rearrange objects within the graphical user interface. Some embodiments provide a pluck operation that distributes two or more objects along a curve in the graphical user interface.

Figure 13A:
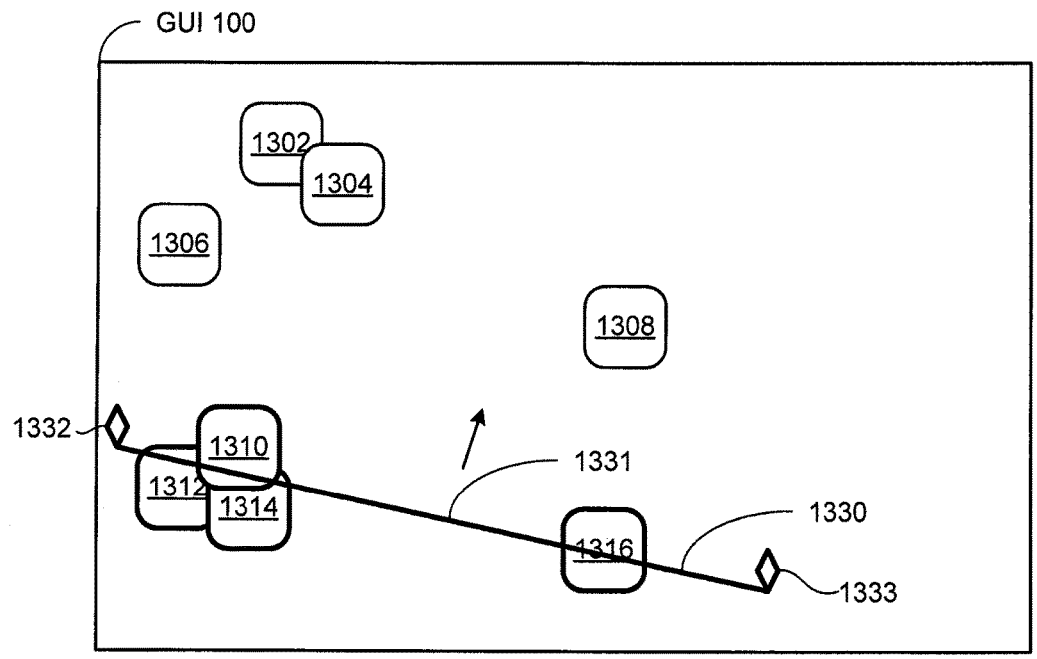
FIG. 13A is a block diagram illustrating a pluck operation being performed on a path, according to some embodiments.
Figure 13B:
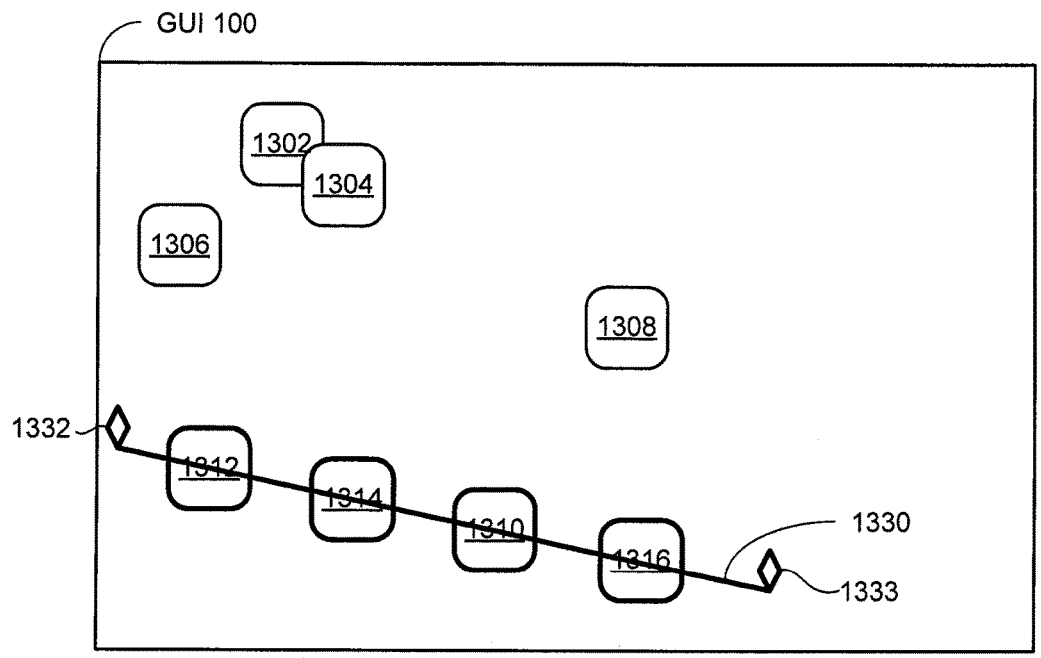
FIG. 13B is a block diagram illustrating the result of the pluck operation illustrated in FIG. 13A, according to some embodiments.

FIGS. 13A-13B are block diagrams illustrating a pluck operation being performed on a path, according to some embodiments. FIGS. 13A-13B include objects 1302-1316 displayed in the graphical user interface 100. As illustrated in FIG. 13A, a curve corresponding to a path 1330 is displayed in the graphical user interface 100. The curve corresponding to the path 1330 may have been generated during a path generation mode or as a result of a path addition operation, a path subtraction operation, and/or a path modification operation performed on an existing curve. As illustrated in FIG. 13A, the curve corresponding to the path 1330 intersects the objects 1310, 1312, 1314, and 1316. Note that although the curve corresponding to the path 1330 is shown as a straight line, the curve may be any shape.

As illustrated in FIGS. 13A and 13B, a user may initiate a pluck operation at a point 1331 in the direction indicated by the arrow. In response to the pluck operation, the curve corresponding to the path 1330 may vibrate and the objects 1310, 1312, 1314, and 1316 may be distributed along the curve corresponding to the path 1330. In some embodiments, the objects 1310, 1312, 1314, and 1316 are distributed along the curve equidistant from each other.

Figure 23:
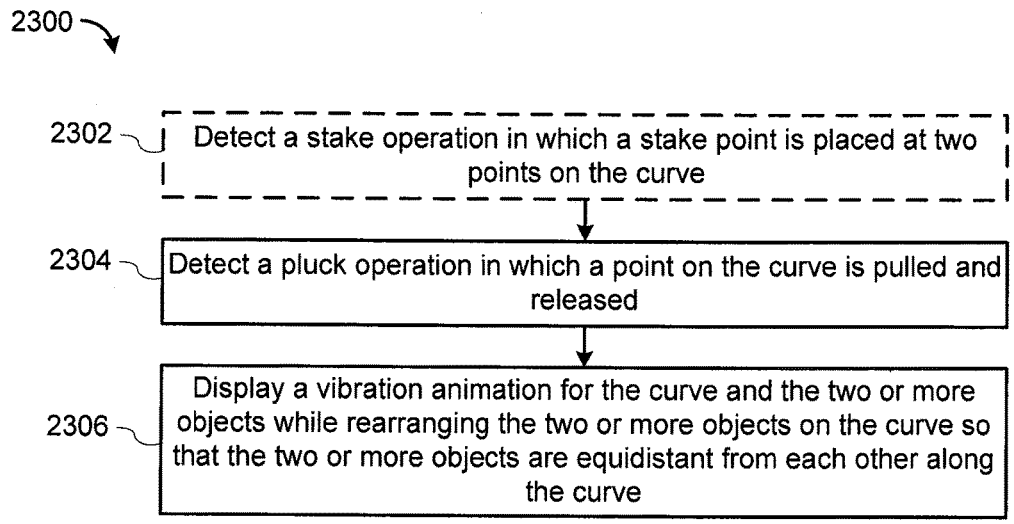
FIG. 23 is a flowchart of a method for rearranging objects in response to a pluck operation, according to some embodiments.

The operations performed by the user interface module 1702 to enable the pluck operation being performed on a path discussed above are described in more detail with respect to FIG. 23, which is a flowchart of a method 2300 for rearranging objects in response to a pluck operation, according to some embodiments. The pluck operation may be performed when the curve intersects two or more objects and the two or more objects are in the "selected" state.

The user interface module 1702 detects (2304) a pluck operation in which a point on the curve is pulled and released. The pluck operation may be initiated after a curve corresponding to a path is displayed in the graphical user interface by accessing a contextual menu (e.g., by right-clicking on the curve, by hovering the cursor over the curve, etc.), a sequence of keystrokes, a gesture, and the like.

The user interface module 1702 displays (2306) a vibration animation for the curve and the two or more objects while rearranging the two or more objects (e.g., the objects 1310, 1312, 1314, and 1316) on the curve so that two or more objects are equidistant from each other along the curve. In some embodiments, the distance between each object in the two or more objects is based on a predetermined formula.

In some embodiments, the pluck operation requires two stake points to be placed on the curve prior to performing the pluck operation. For example, in FIG. 13A, stake points 1332 and 1333 may be placed on the curve corresponding to the path 1331. Although the stake points may be placed at any point on the curve corresponding to the path 1331, the point on the curve that is pulled and released is between the two stake points. Furthermore, only the objects between the two stake points are rearranged in response to the pluck operation. In these embodiments, the user interface module 1702 detects (2302) a stake operation in which a stake point is placed at two points on the curve. The stake points prevent the two points on the curve from moving. Furthermore, the vibration animation is displayed only for portions of the curve and a subset of the two or more objects that are between the two stake points.

Rotation Operation

Some embodiments provide a rotation operation that rotates a curve and objects intersecting the curve that are in the "selected" state about a pivot point.

Figure 14A:
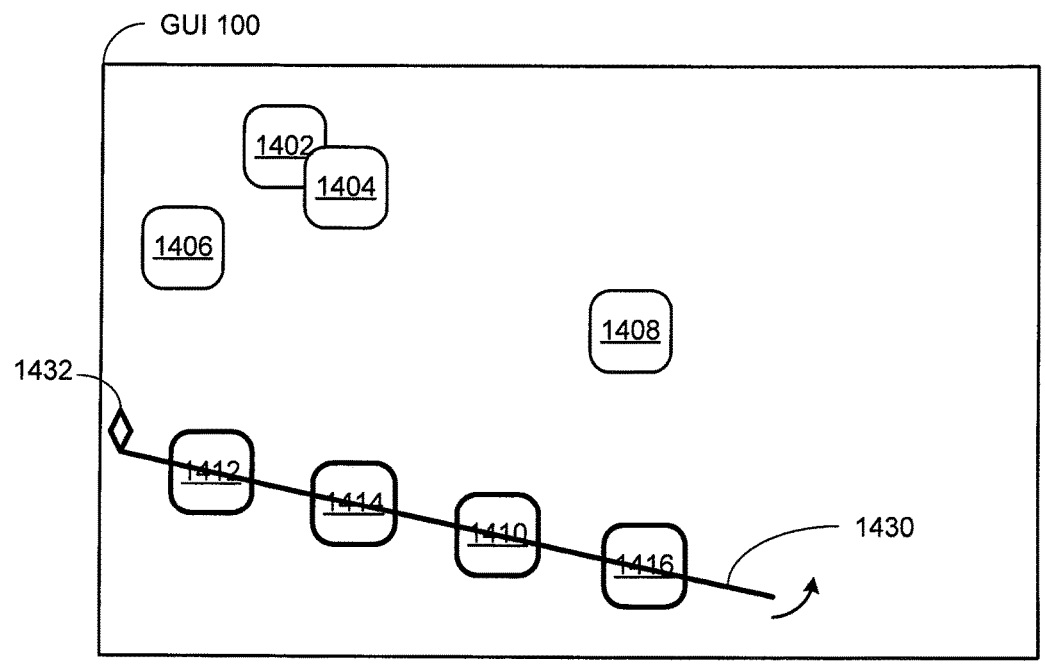
FIG. 14A is a block diagram illustrating a rotation operation being performed on a path including a stake point, according to some embodiments.
Figure 14B:
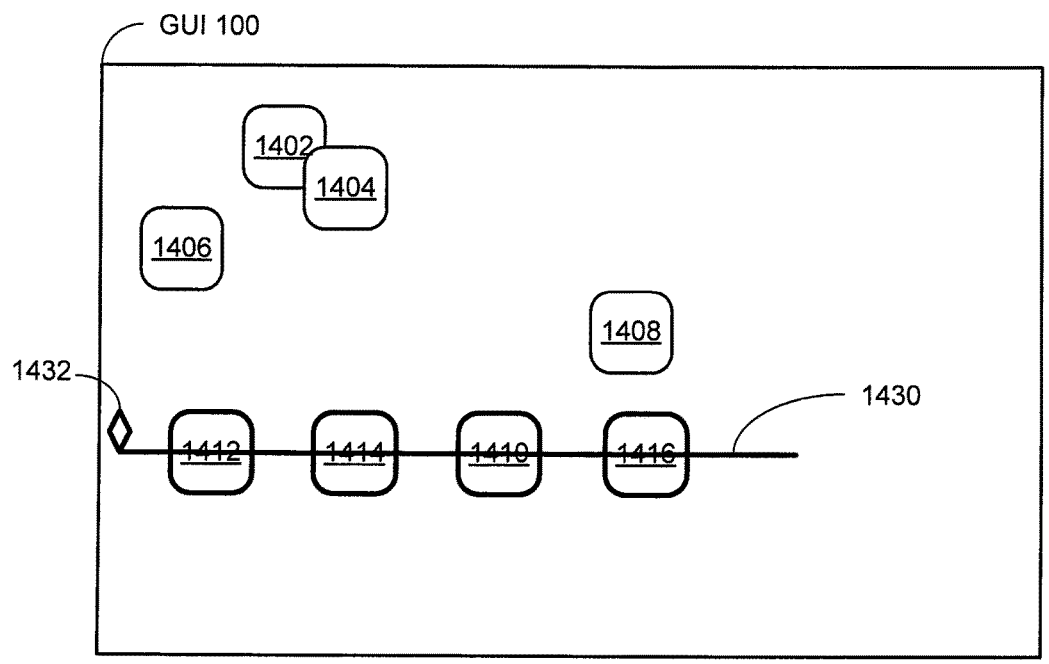
FIG. 14B is a block diagram illustrating the continuation of the rotation operation illustrated in FIG. 14A, according to some embodiments.

FIGS. 14A-14B are block diagrams illustrating a rotation operation being performed on a path, according to some embodiments. FIGS. 14A-14B include objects 1402-1416 displayed in the graphical user interface 100. As illustrated in FIG. 14A, a curve corresponding to a path 1430 is displayed in the graphical user interface 100. The curve corresponding to the path 1430 may have been generated during a path generation mode or as a result of a path addition operation, a path subtraction operation, and/or a path modification operation performed on an existing curve. As illustrated in FIG. 14A, the curve corresponding to the path 1430 intersects the objects 1410, 1412, 1414, and 1416. Note that although the curve corresponding to the path 1430 is shown as a straight line, the curve may be any shape.

As illustrated in FIGS. 14A and 14B, a user may initiate a rotation operation in the direction indicated by the arrow. In response to the rotation operation, the curve corresponding to the path 1430 and the objects 1410, 1412, 1414, and 1416 are rotated about a pivot point (e.g., a pivot point 1432). Note that the shape of the curve corresponding to the path 1430 does not change and the objects 1410, 1412, 1414, and 1416 remain at their respective positions on the curve as the curve is rotated about the pivot point. Also note that the pivot point 1432 may be placed at any point on the curve corresponding to the path 1430. In some embodiments, the pivot point 1432 is a stake point.

Figure 24:
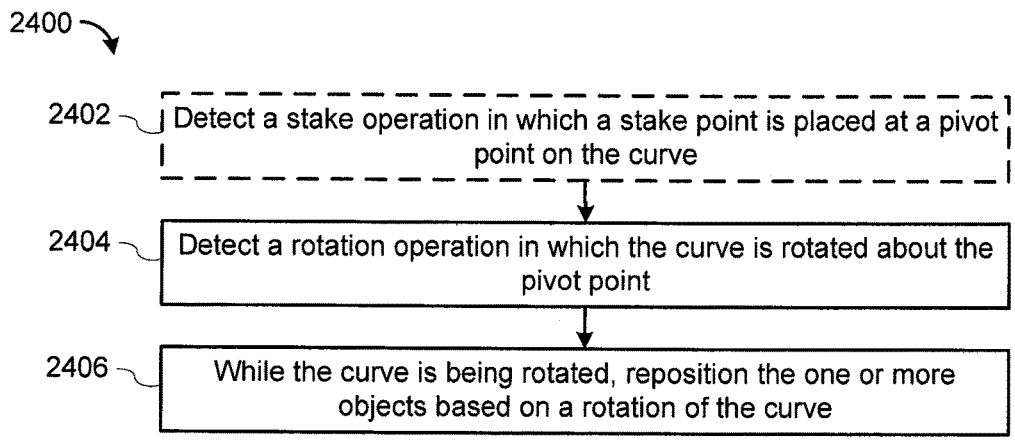
FIG. 24 is a flowchart of a method for rearranging objects in response to a rotation operation, according to some embodiments.

The operations performed by the user interface module 1702 to enable the rotation operation being performed on a path discussed above are described in more detail with respect to FIG. 24, which is a flowchart of a method 2400 for rearranging objects in response to a rotation operation, according to some embodiments. The rotation operation may be performed when the one or more objects intersected by the curve are in the "selected" state.

The user interface module 1702 detects (2404) a rotation operation in which the curve is rotated about a pivot point (e.g., the pivot point 1432). The rotation operation may be initiated after a curve corresponding to a path is displayed in the graphical user interface by accessing a contextual menu (e.g., by right-clicking on the curve, by hovering the cursor over the curve, etc.), a sequence of keystrokes, a gesture, and the like.

While the curve is being rotated, the user interface module 1702 repositions (2406) the one or more objects (e.g., the objects 1410, 1412, 1414, and 1416) based on a rotation of the curve. For example, the curve and the one or more objects are rotated about the pivot point.

In some embodiments, the rotation operation requires at least one stake point to be placed on the curve prior performing the rotation operation. In these embodiments, the user interface module 1702 detects (2402) a stake operation in which a stake point is placed at the pivot point (e.g., the pivot point 1432) on the curve, wherein the stake point prevents the pivot point on the curve from moving.

Move Operation

Some embodiments provide a move operation that moves a curve and objects intersecting the curve that are in the "selected" state.

Figure 15A:
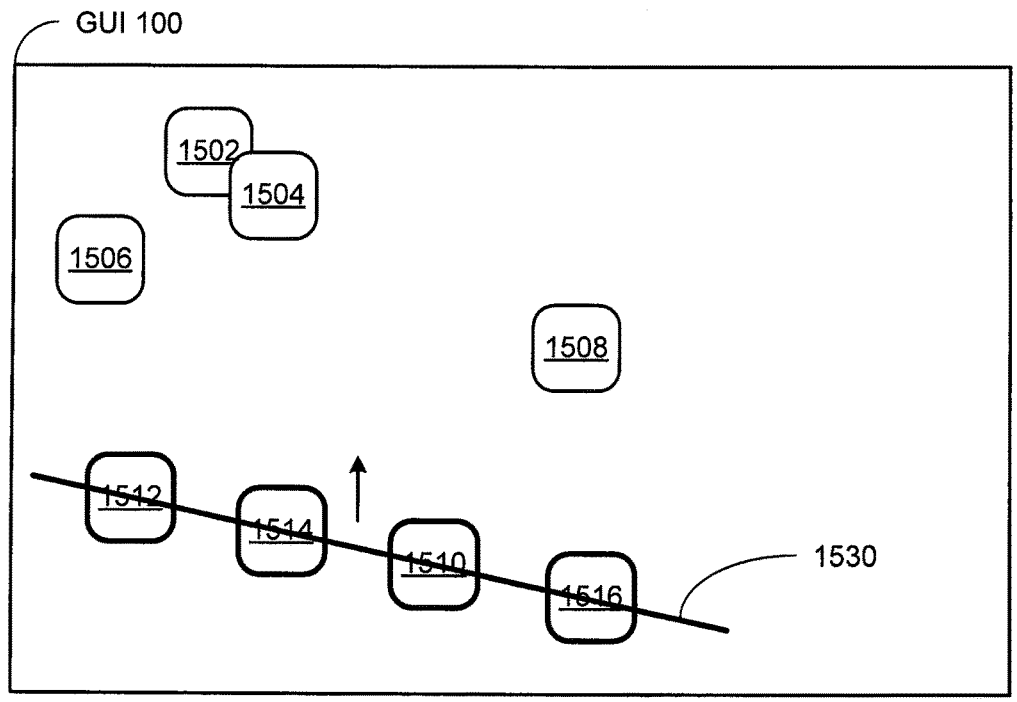
FIG. 15A is a block diagram illustrating a move operation being performed on a path, according to some embodiments.
Figure 15B:
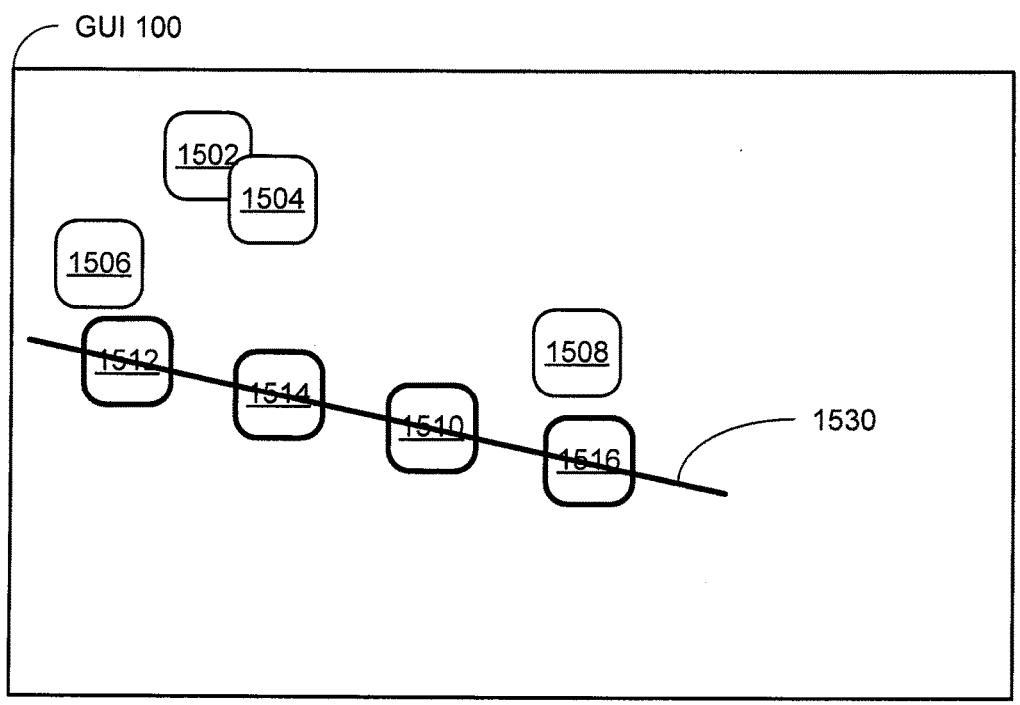
FIG. 15B is a block diagram illustrating the continuation of the move operation illustrated in FIG. 15A, according to some embodiments.

FIGS. 15A-15B are a block diagrams illustrating a move operation being performed on a path, according to some embodiments. FIGS. 15A-15B include objects 1502-1516 displayed in the graphical user interface 100. As illustrated in FIG. 15A, a curve corresponding to a path 1530 is displayed in the graphical user interface 100. The curve corresponding to the path 1530 may have been generated during a path generation mode or as a result of a path addition operation, a path subtraction operation, and/or a path modification operation performed on an existing curve. As illustrated in FIG. 15A, the curve corresponding to the path 1530 intersects the objects 1510, 1512, 1514, and 1516. Note that although the curve corresponding to the path 1530 is shown as a straight line, the curve may be any shape.

As illustrated in FIGS. 15A and 15B, a user may initiate a move operation in the direction indicated by the arrow. In response to the move operation, the curve corresponding to the path 1530 and the objects 1510, 1512, 1514, and 1516 are moved as a unit. Note that the shape of the curve corresponding to the path 1530 does not change and the objects 1510, 1512, 1514, and 1516 remain at their respective positions on the curve as the curve is moved.

Figure 25:
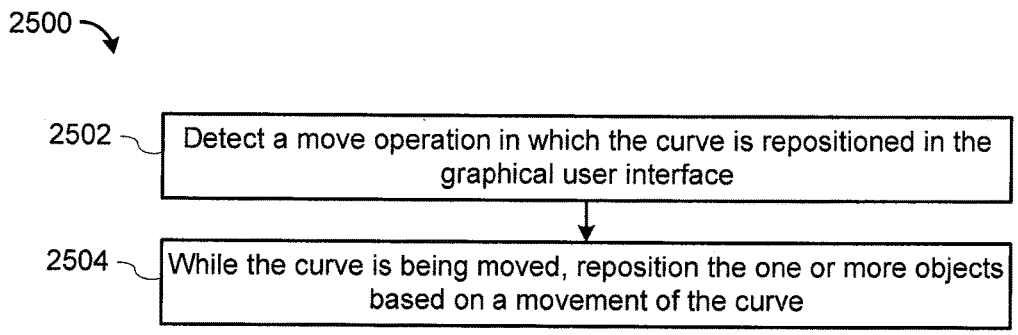
FIG. 25 is a flowchart of a method for rearranging objects in response to a move operation, according to some embodiments.

The operations performed by the user interface module 1702 to enable the move operation being performed on a path discussed above are described in more detail with respect to FIG. 25, which is a flowchart of a method 2500 for rearranging objects in response to a move operation, according to some embodiments. The move operation may be performed when the one or more objects intersected by the curve are in the "selected" state.

The user interface module 1702 detects (2502) a move operation in which the curve is repositioned in the graphical user interface. The move operation may be initiated after a curve corresponding to a path is displayed in the graphical user interface by accessing a contextual menu (e.g., by right-clicking on the curve, by hovering the cursor over the curve, etc.), a sequence of keystrokes, a gesture, and the like.

While the curve is being moved, the user interface module 1702 repositions (2504) the one or more objects based on a movement of the curve. For example, the curve corresponding to the path 1530 and the objects Pull Operation and Stake Point Some embodiments provide one or more stake points that are placed on a curve to constrain the movement of the curve at the one or more stake points.

Figure 16A:
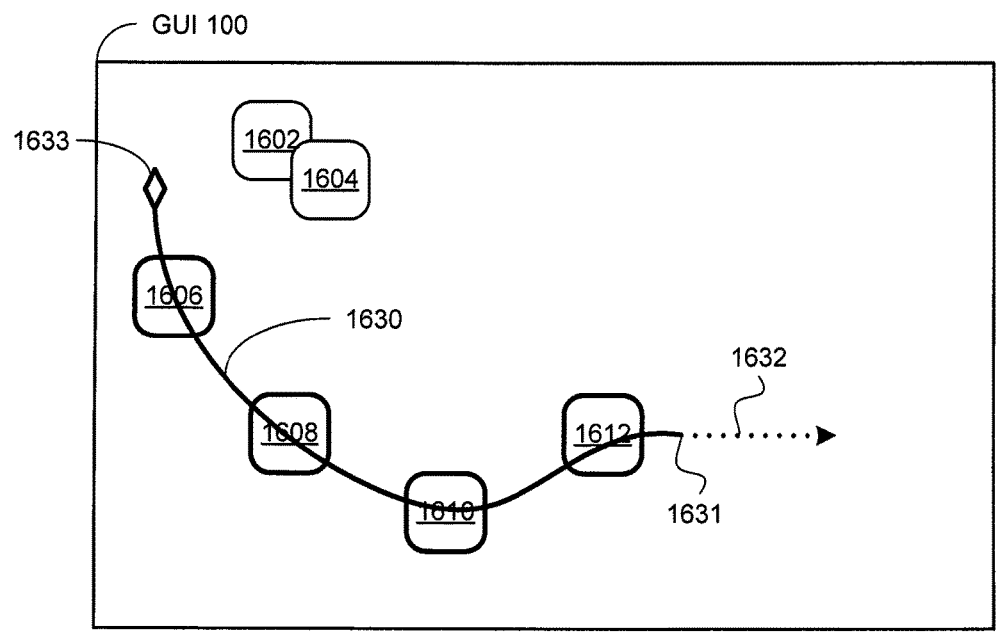
FIG. 16A is a block diagram illustrating a pull operation being performed on a path including a stake point, according to some embodiments.
Figure 16B:
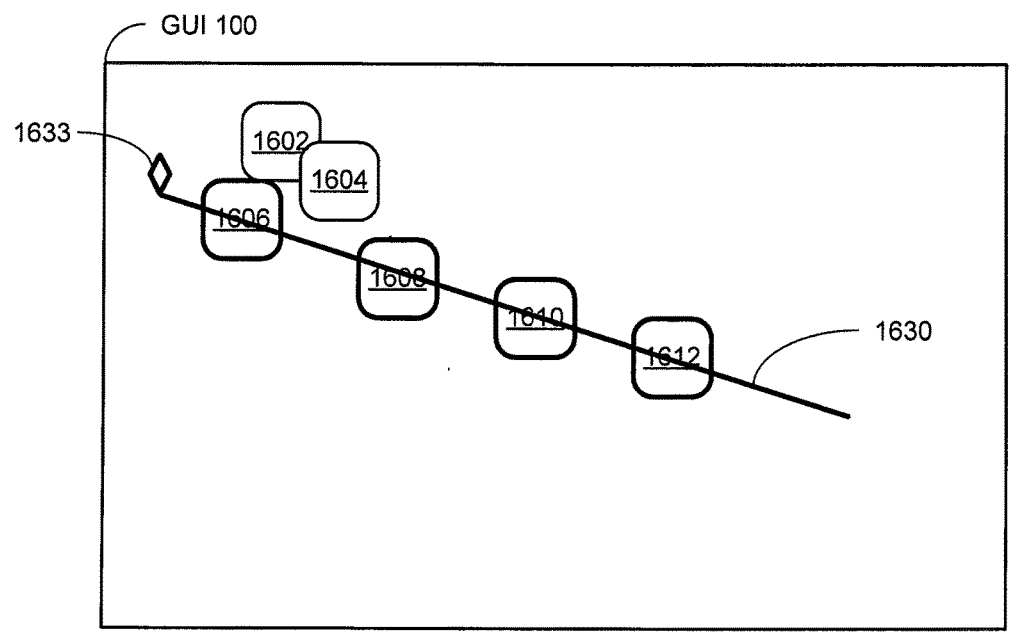
FIG. 16B is a block diagram illustrating the continuation of the pull operation illustrated in FIG. 16A, according to some embodiments.
Figure 17:
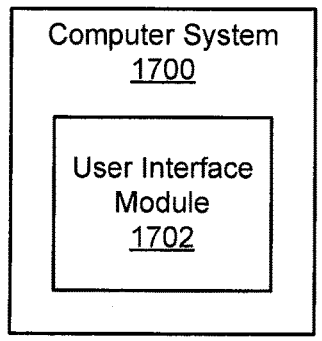
FIG. 17 is a block diagram illustrating a computer system, according to some embodiments.

FIGS. 16A-16B are block diagrams illustrating a pull operation being performed on a path including a stake point, according to some embodiments. FIGS. 16A-16B include objects 1602-1612 displayed in the graphical user interface 100. As illustrated in FIG. 16A, a curve corresponding to a path 1630 is displayed in the graphical user interface 100. The curve corresponding to the path 1630 may have been generated during a path generation mode or as a result of a path addition operation, a path subtraction operation, and/or a path modification operation performed on an existing curve. As illustrated in FIG. 16A, the curve corresponding to the path 1630 intersects the objects 1606, 1608, 1610, and 1612. The curve also includes a stake point 1633 that prevents the point on the curve that is at the stake point from moving. Note that that stake point may be placed at any point along the curve. Once the pull operation has been initiated, the curve may be pulled.

As illustrated in FIGS. 16A and 16B, a user pulls the curve corresponding to the path 1630 from a point 1631 (e.g., an end of the curve) along a path 1632, as indicated by the dashed line in FIG. 16A. The stake point 1633 prevents the point on the curve at the stake point 1633 from moving. For example, as illustrated in FIG. 16B, as the curve is pulled, the curve changes shape to conform to the path traveled by the point 1631. As the shape of the curve changed and/or moved, the objects 1606, 1608, 1610, and 1612 remain at their respective positions on the curve, as illustrated in FIG. 16B.

Figure 26:
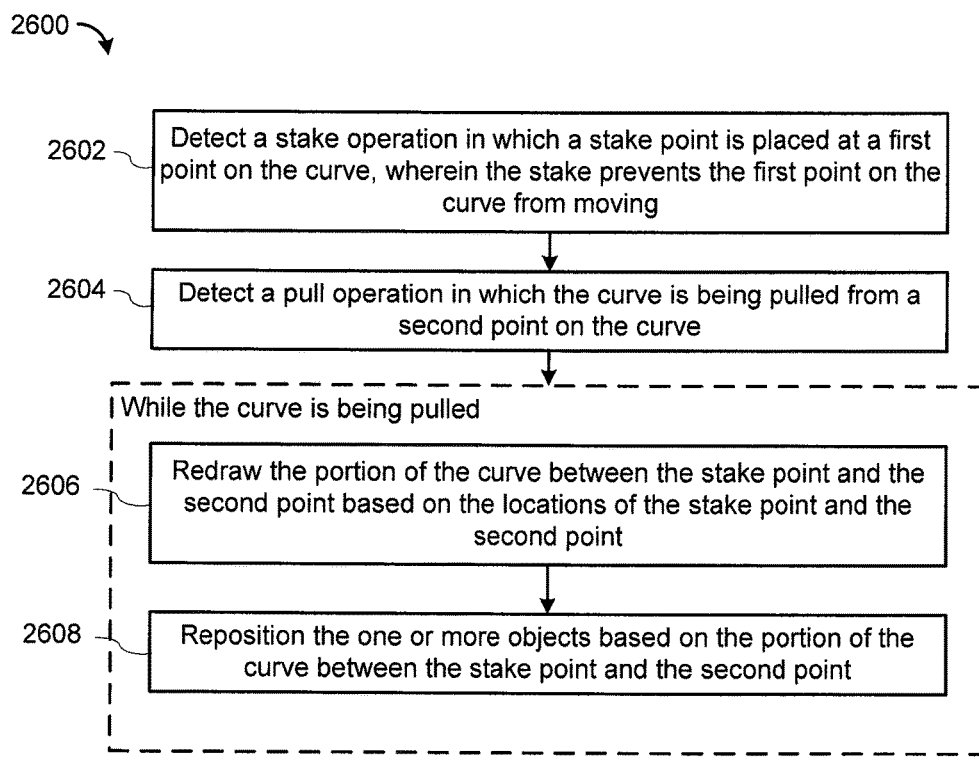
FIG. 26 is a flowchart of a method for rearranging objects in response to a pull operation performed on a path including a stake point, according to some embodiments.

The operations performed by the user interface module 1702 to enable the pull operation being performed on a path including a stake point discussed above is described in more detail with respect to FIG. 26, which is a flowchart of a method 2600 for rearranging objects in response to a pull operation performed on a path including a stake point, according to some embodiments. The pull operation performed on the path including the stake point may be performed when the one or more objects intersected by the curve are in the "selected" state.

The user interface module 1702 detects (2602) a stake operation in which a stake point (e.g., the stake point 1633) is placed at a first point on the curve, wherein the stake point prevents the first point on the curve from moving. The stake operation may be initiated after a curve corresponding to a path is displayed in the graphical user interface by accessing a contextual menu (e.g., by right-clicking on the curve, by hovering the cursor over the curve, etc.), a sequence of keystrokes, a gesture, and the like.

The user interface module 1702 detects (2604) a pull operation in which the curve is being pulled from a second point on the curve (e.g., the point 1631). In some embodiments, only a portion of the curve between the stake point (e.g., the stake point 1633) and the second point (e.g., the point 1631) is allowed to move. In some embodiments, a length of the curve remains constant during the pull operation. As discussed above, the pull operation may be initiated when a user causes a cursor of the graphical user interface to intersect (e.g., hover) the curve for a predetermined amount of time. Alternatively, the pull operation may be initiated using any of the techniques discussed above with respect to starting and/or ending the path selection mode.

While the curve is being pulled, the following operations are performed. The user interface module 1702 redraws (2606) the portion of the curve between the stake point and the second point based on the locations of the stake point and the second point. The user interface module 1702 repositions (2608) the one or more objects based on the portion of the curve between the stake point and the second point. For example, the curve corresponding to the path 1630 is redrawn and the objects 1606, 1608, 1610, and 1612 are repositioned as illustrated in FIG. 16B.

Note that the pull operation with its variations (e.g., with a hold area, with a knot point, with a stake point, etc.), the pluck operation, the rotation operation, and the move operation only affect objects that are in the "selected" state. In general, objects that intersect the curve but that are in the "deselected" state are not affected by these operations. However, a pull operation that (1) causes the curve to intersect new or already-intersected objects or (2) causes the curve to stop intersecting or intersect already-interested objects a fewer number of times, may cause the selection state of objects to change.

Exemplary Machine

Figure 30:
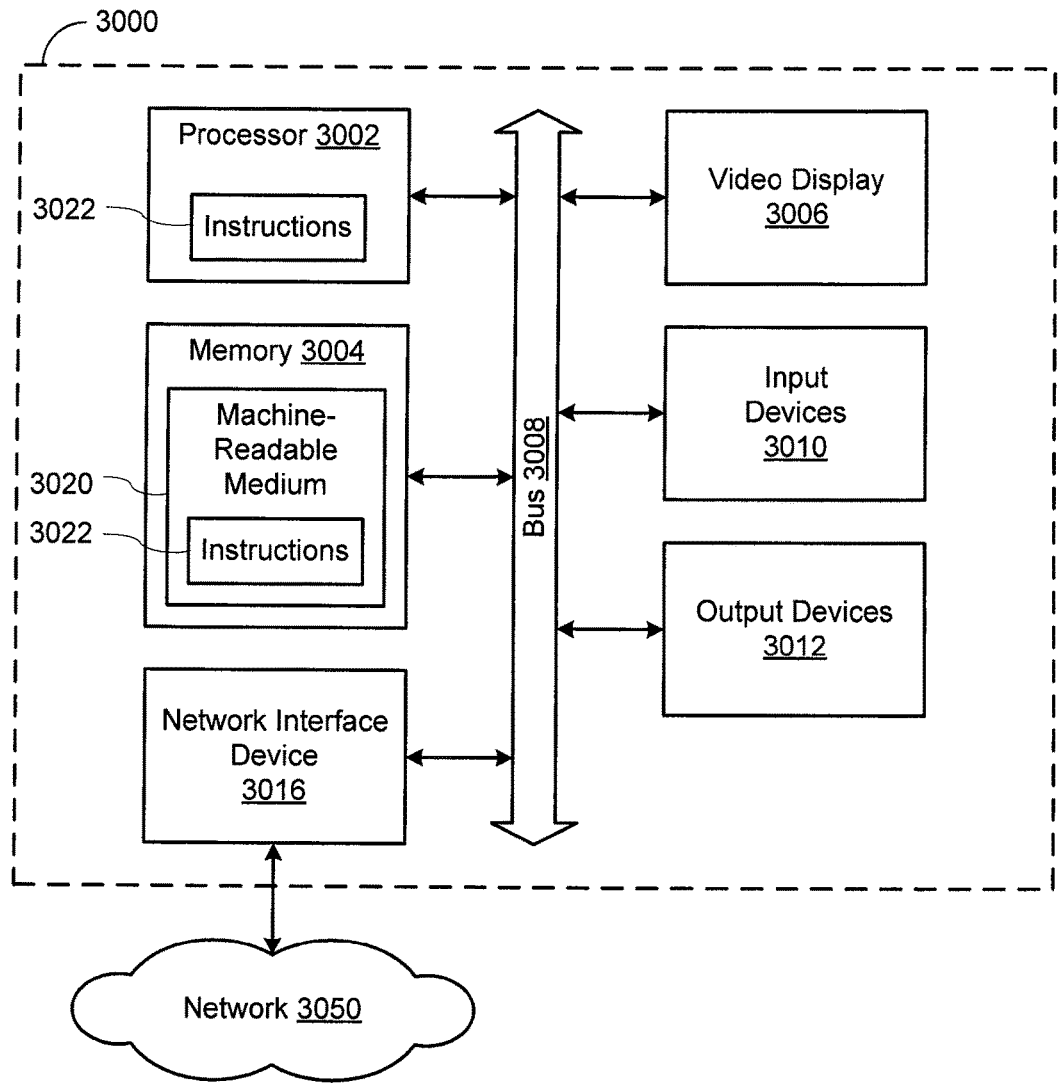
FIG. 30 is a block diagram of an exemplary machine, according to some embodiments.

FIG. 30 depicts a block diagram of a machine in the example form of a computer system 3000 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computer system 3000 includes a processor 3002 (e.g., a central processing unit (CPU), a graphics processing unit (GPU) or both), and memory 3004, which communicate with each other via bus 3008. Memory 3004 includes volatile memory devices (e.g., DRAM, SRAM, DDR RAM, or other volatile solid state memory devices), non-volatile memory devices (e.g., magnetic disk memory devices, optical disk memory devices, flash memory devices, tape drives, or other non-volatile solid state memory devices), or a combination thereof. Memory 3004 may optionally include one or more storage devices remotely located from the computer system 3000. The computer system 3000 may further include a video display unit 3006 (e.g., a plasma display, a liquid crystal display (LCD) or a cathode ray tube (CRT)). Note that the video display unit 3006 may be a 2-dimensional display unit or a 3-dimensional display unit. The computer system 3000 also includes input devices 3010 (e.g., keyboard, mouse, trackball, touchscreen display, etc.), output devices 3012 (e.g., speakers), and a network interface device 3016. The aforementioned components of the computer system 3000 may be located within a single housing or case (e.g., as depicted by the dashed lines in FIG. 30). Alternatively, a subset of the components may be located outside of the housing. For example, the video display unit 3006, the input devices 3010, and the output devices 3012 may exist outside of the housing, but be coupled to the bus 3008 via external ports or connectors accessible on the outside of the housing.

Memory 3004 includes a machine-readable medium 3020 on which is stored one or more sets of data structures and instructions 3022 (e.g., software) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions 3022 may also reside, completely or at least partially, within memory 3004 and/or within the processor 3002 during execution thereof by computer system 3000, with memory 3004 and processor 3002 also constituting machine-readable, tangible media.

The data structures and instructions 3022 may further be transmitted or received over a network 3050 via network interface device 3016 utilizing any one of a number of well-known transfer protocols (e.g., HyperText Transfer Protocol (HTTP)). Network 3050 can generally include any type of wired or wireless communication channel capable of coupling together computing nodes (e.g., the computer system 3000). This includes, but is not limited to, a local area network (LAN), a wide area network (WAN), or a combination of networks. In some embodiments, network 3050 includes the Internet.

Certain embodiments are described herein as including logic or a number of components, modules, or mechanisms. Modules may constitute either software modules (e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 3000) or one or more hardware modules of a computer system (e.g., a processor 3002 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor 3002 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a processor 3002 configured using software, the processor 3002 may be configured as respective different hardware modules at different times. Software may accordingly configure a processor 3002, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 3002 that are temporarily configured (e.g., by software, code, and/or instructions stored in a machine-readable medium) or permanently configured to perform the relevant operations. Whether temporarily or permanently configured, such processors 3002 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 3002 or processor-implemented (or computer-implemented) modules. Similarly, at least some of the operations of a method may be governed by instructions that are stored in a computer readable storage medium and executed by one or more processors 3002 or processor-implemented (or computer-implemented) modules. The performance of certain of the operations may be distributed among the one or more processors 3002, not only residing within a single machine, but deployed across a number of machines. In some example embodiments, the processors 3002 may be located in a single location (e.g., within a home environment, an office environment or as a server farm), while in other embodiments the processors 3002 may be distributed across a number of locations.

While the embodiment(s) is (are) described with reference to various implementations and exploitations, it will be understood that these embodiments are illustrative and that the scope of the embodiment(s) is not limited to them. In general, techniques for the embodiments described herein may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and its practical applications, to thereby enable others skilled in the art to best utilize the embodiments and various embodiments with various modifications as are suited to the particular use contemplated.

What is claimed is:

1. A computer-implemented method for manipulating objects in a graphical user interface for a display device, the method comprising:
    detecting a start of a path selection mode;
    detecting a first path traversed by a cursor in the graphical user interface;
    displaying a curve corresponding to the first path in the graphical user interface; and
    upon detecting an end of the path selection mode, updating a selection state of one or more objects displayed in the graphical user interface based on the displayed curve, the selection state including a selected state and a deselected state, the updating of the selection state of the one or more objects comprising, for each of the one or more objects:
        determining a total number of times that the displayed curve passes across the object;
        toggling the selection state of the object based on the number of times being an odd number; and
        not toggling the selection state of the object based on the number of times being an even number.

2. The computer-implemented method of claim 1; further comprising:
    detecting a pull operation in which the curve is pulled from a point on the curve along a second path, wherein portions of the curve that are on the first path are constrained to move along the first path; and
    while the curve is being pulled, redrawing the curve based on the first path, the second path, and a length of the curve.

3. The computer-implemented method of claim 2, wherein the length of the curve remains constant during the pull operation.

4. The computer-implemented method of claim 2, wherein the length of the curve decreases during the pull operation.

5. The computer-implemented method of claim 2; wherein the length of the curve increases during the pull operation.

6. The computer-implemented method of claim 1, further comprising:
    creating a knot point at a first point on the curve, wherein the knot point cannot be pulled through objects;
    detecting a pull operation in which the curve is pulled from a second point on the curve along a second path, wherein points of the curve that are on the first path are constrained to move along the first path; and
    while the curve is being pulled,
        redrawing the curve based on the first path and the second path; and
        when the knot point on the curve is pulled against an object in the one or more objects; repositioning the object based on the first path and the second path.

7. The computer-implemented method of claim 6, further comprising when the object being repositioned contacts a second object on the curve, repositioning the object and the second object based on the first path and the second path.

8. The computer-implemented method of claim 1, further comprising:
    detecting that a hold area is placed over one or more portions on the curve, wherein the hold area is a fixed area that maintains the shape of the curve that is in the hold area;
    detecting a pull operation in which the curve is being pulled from a second point on the curve along a second path; wherein portions of the curve in the hold area are constrained to move through the hold area in accordance with the shape of the curve in the hold area; and
    while the curve is being pulled,
        redrawing portions of the curve external to the hold area so that the portions of the curve external to the hold area are pulled closer to the hold area; and
        modifying the one or more objects based on the curve.

9. The computer-implemented method of claim 8, wherein modifying the one or more objects includes one or more of:
    repositioning the one or more objects;
    resizing the one or more objects;
    selecting the one or more objects; and
    deselecting the one or more objects.

10. The computer-implemented method of claim 1, wherein the one or more objects are in the selected state, and wherein the method further comprises:
  detecting a rotation operation in which the curve is rotated about a pivot point; and
  while the curve is being rotated, repositioning the one or more objects based on a rotation of the curve.

11. The computer-implemented method of claim 10, wherein prior to detecting the rotation operation, the method further comprises detecting a stake operation in which a stake point is placed at the pivot point on the curve, wherein the stake point prevents the pivot point on the curve from moving.

12. The computer-implemented method of claim 1, wherein the one or more objects are in the selected state, and wherein the method further comprises:
  detecting a move operation in which the curve is repositioned in the graphical user interface; and
  while the curve is being moved, repositioning the one or more objects based on a movement of the curve.

13. The computer-implemented method of claim 1, wherein the method further comprises:
  detecting a path addition operation;
  detecting a third path traversed by the cursor in the graphical user interface, the third path starting from an end point of the curve;
  redrawing the curve so that the curve includes the third path; and
  updating the selection state of the one or more objects based on the curve.

14. The computer-implemented method of claim 1, wherein the method further comprises:
  detecting a path modification operation;
  detecting that one or more points on the curve are moved to new positions;
  redrawing the curve based on the new positions of the one of more points on the curve; and
  updating the selection state of the one or more objects based on the curve.

15. The computer-implemented method of claim 1, wherein the method further comprises:
  detecting a path subtraction operation;
  detecting a third path traversed by the cursor in the graphical user interface;
  redrawing the curve so that portions of the curve that pass across the third path are deleted; and
  updating the selection state of the one or more objects based on the cr.

16. The computer-implemented method of claim 1, wherein the selection state of the one or more objects is updated as the path is being drawn.

17. The computer-implemented method of claim 1, wherein the selection state of the one or more objects is updated after the end of the path selection mode.

18. The computer-implemented method of claim 1, wherein the curve is displayed as the path is drawn.

19. The computer-implemented method of claim 1, wherein the curve is displayed after the end of the path selection mode.

20. The computer-implemented method of claim 1, wherein the curve is a curve in two-dimensional space.

21. The computer-implemented method of claim 1, wherein the curve is a curve in three-dimensional space.

22. A system to manipulate objects in a graphical user interface for a display device, the system comprising:
  at least one processor;
  memory; and
  at least one program stored in the memory, the at least one program comprising instructions to:
    detect a start of a path selection mode;
    detect a first path traversed by a cursor in the graphical user interface;
    display a curve corresponding to the first path in the graphical user interface; and
    upon detecting an end of the path selection mode, update a selection state of each of one or more objects of a plurality of objects displayed in the graphical user interface to one of a selected state and a deselected state by:
      determining a number of times that the displayed curve passes across the object;
      toggling the selection state of the object based on the number of times being an odd number; and
      not toggling the selection state of the object based on the number of times being an even number.

23. A computer readable storage medium storing at least one program configured for execution by a computer, the at least one program comprising instructions that, when executed by the computer, cause the computer to perform operations comprising:
  detecting a start of a path selection mode;
  detecting a first path traversed by a cursor in a graphical user interface of a display device;
  displaying a curve corresponding to the first path in the graphical user interface; and
  upon detecting an end of the path selection mode, updating a selection state of each of one or more objects of a plurality of objects displayed in the graphical user interface to one of a selected state and a deselected state by:
    determining a number of times that the displayed curve passes across the object;
    toggling the selection state of the object based on the number of times being an odd number; and
    not toggling the selection state of the object based on the number of times being an even number.

* * * * *